United States Patent

Stephenson

[15] 3,703,726
[45] Nov. 21, 1972

[54] QUANTITATIVE CHEMICAL ANALYSIS BY X-RAY EMISSION SPECTROSCOPY

[72] Inventor: Donald A. Stephenson, Corning, N.Y.

[73] Assignee: Corning Glass Works, Corning, N.Y.

[22] Filed: Dec. 31, 1970

[21] Appl. No.: 103,193

[52] U.S. Cl. ............ 444/1, 235/151.3, 235/151.35, 250/51.5
[51] Int. Cl. .................................... G06f 15/46
[58] Field of Search. 235/151, 151.12, 151.3, 151.35; 250/41.9 R, 51.5, 83.3 R, 95; 252/408; 444/1

[56] References Cited

UNITED STATES PATENTS

| | | |
|---|---|---|
| 3,581,087 | 5/1971 | Brinkerhoff et al. ......250/51.5 |
| 3,537,820 | 11/1970 | Markant et al. ...235/151.12 X |
| 3,456,108 | 7/1969 | Pichoir .................250/51.5 X |
| 3,428,802 | 2/1969 | Mehta et al...............250/51.5 |
| 3,600,567 | 8/1971 | Varnela............235/151.12 X |
| 3,553,444 | 1/1971 | Tong....................235/151.35 |

Primary Examiner—Charles E. Atkinson
Assistant Examiner—Jerry Smith
Attorney—Clarence R. Patty, Jr., Walter Zebrowski and Woodcock, Washburn, Jurtz & Mackiewicz

[57] ABSTRACT

In X-ray emission spectrometry a quantitative chemical analysis of the elements in an unknown sample is obtained. A standard, or standards, whose composition has previously been accurately established is used to determine the first order approximation to the original intensity of the most efficient excitation energy for each element being determined. The most efficient excitation energy is defined as that energy which is just greater than the energy of the absorption edge of the characteristic X-ray emission line employed in the analysis. Using the computed original intensity of the most efficient excitation energy for each element in the standard(s), the observed X-ray intensities measured on the unknown, and an assumed chemical composition of the unknown, the expected characteristic X-ray intensity for each element in the unknown is computed. The assumed chemical composition of the unknown is then adjusted by a self-consistent iterative procedure until the expected and observed X-ray intensities for each element being determined agree. In this manner the best estimate of the chemical composition of the unknown is determined.

3 Claims, 2 Drawing Figures

QUANTITATIVE CHEMICAL ANALYSIS BY X-RAY EMISSION SPECTROSCOPY

BACKGROUND OF THE INVENTION

This invention relates to X-ray emission spectrometry and more particularly to the quantitative chemical analysis of a sample based on the theoretical interpretation of X-ray emission spectra.

Methods of X-ray detection have been improved so that it is now a simple routine to accurately measure relative X-ray intensities. X-ray spectrometry is now extensively used in both quantitative and qualitative chemical analysis. *X-ray Absorption and Emission in Analytical Chemistry*, Liebhafsky, Pfeiffer, Winslow and Zemany, 1969, John Wiley & Sons, Inc., describes techniques of X-ray emission analysis.

The advent of the general purpose digital computer has enabled many X-ray emission analyses to be performed which previously were impractical because of the burdensome number of calculations or table lookups to be performed. One such use of a digital computer to perform a qualitative analysis from X-ray emission data was made by Mr. Frank Chambers, IBM Corporation and demonstrated at the Conference on Analytical Chemistry, Pittsburg, Pennsylvania, 1968. J. W. Criss and L. S. Birks in Volume 40 of "Analytical Chemistry" describe the use of digital computers to perform quantitative X-ray emission analysis by different techniques.

Previous theoretical treatments of X-ray emission data for quantitative analysis described by J. W. Criss and L. S. Birks in Volume 40 of "Analytical Chemistry" and by T. Shiraiwa and N. Fujino in Volume 5 of the "Japanese Journal of Applied Physics" have been impractical because they require a detailed knowledge of the spectral distribution of the X-ray tube used to excite characteristic X-ray spectra of the elements contained in the analyzed sample. This information is quite difficult to accurately obtain and the corresponding correction calculations are more complex.

SUMMARY OF THE INVENTION

In accordance with an important aspect of this invention a single most efficient X-ray excitation energy for each element in a sample is defined. This energy is just greater than the X-ray absorption edge of the characteristic X-ray emission line of the element being determined. Using a first order approximation of the intensity of the most efficient energy obtained from standards, the expected X-ray intensity for each element in the unknown is computed based upon an assumed chemical composition. This expected X-ray intensity is then compared with the observed intensity for that element. Using a self-consistent iterative procedure the weight percents of the elements in the unknown are adjusted so that the observed and calculated X-ray intensities agree. When the observed and calculated X-ray emission intensities coincide, the adjusted weight percents of the elements are the best estimates of the chemical composition of the sample.

This technique of assuming a single X-ray excitation energy and using the inverse self-consistent iterative adjustment procedure to perform a quantitative analysis is less complex than performing a quantitative analysis based upon a detailed knowledge of the spectral distribution of the X-ray tube used to excite the elements. It has the advantage of being performed completely automatically in a very short time and with accuracy comparable to that of wet chemical analysis.

DESCRIPTION OF A PARTICULAR EMBODIMENT

Figure 1:
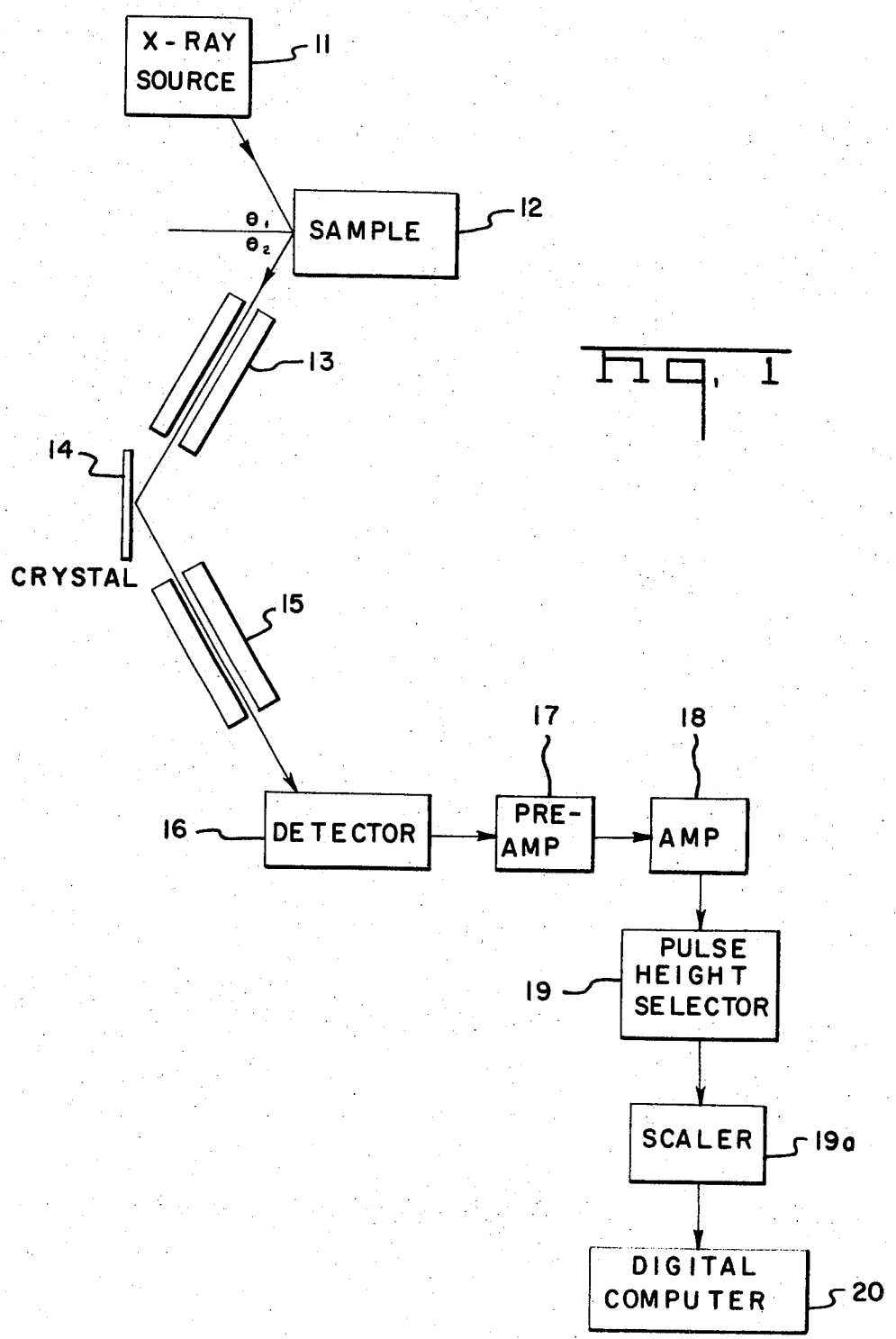
FIG. 1 shows a block diagram of typical X-ray emission measurement system.

FIG. 1 depicts an X-ray emission spectrometric system which is typical of but not limiting of the systems to which the present invention is applicable. It will be appreciated that this invention is also applicable to similar analytical techniques which produce X-rays for the examination of materials.

In the X-ray emission spectrometer, a chromium or tungsten target X-ray tube is commonly used for the X-ray source 11. Radionuclides may also be used. X-rays from this source irradiate the sample 12 at an angle of incidence $\theta_1$. Excitation of each element in the sample produces characteristic X-rays observed at an angle $\theta_2$.

The emitted radiation is collimated by the collimator 13. An analyzing crystal 14 resolves the emitted spectrum which is again collimated by a collimator 15.

The intensity measurement system includes an X-ray detector 16 producing pulses proportional in number and energy to the emitted X-ray photons. These pulses are amplified and shaped by preamplifier 17 and amplifier 18 to provide a useful signal. A pulse height selector 19 selects pulses of appropriate energy to be counted and rejects others. The pulses are counted by a scaler 19a or similar electronic counter for an appropriate time and these data are suitable for input to a digital computer 20.

Systems of the type described with reference to FIG. 1 have been used quite successfully for the identification of elements in a sample, i.e., qualitative analysis, and for quantitative analysis based on techniques different than those described herein. While the intensity of each X-ray line is related to the amount of each element in the sample, the relationship is complicated, and variations in the characteristics of the X-ray source 11 affect the observed intensities.

In accordance with the present invention it is not necessary to precisely determine the characteristics of the X-ray source. Rather, it is assumed that the X-rays which irradiate the sample are monochromatic and have an energy which is just slightly greater than the X-ray absorption edge of the characteristic X-ray emission line of each element in question.

Absorption edges, or critical absorption energies, are discussed more fully in the aforementioned text *X-Ray Absorption and Emission in Analytical Chemistry*, page 16. For the simplified purposes of this discussion, the X-ray absorption edge is the critical energy necessary to expel an electron from the particular energy level responsible for the production of characteristic X-rays of each element in the sample.

Figure 2:
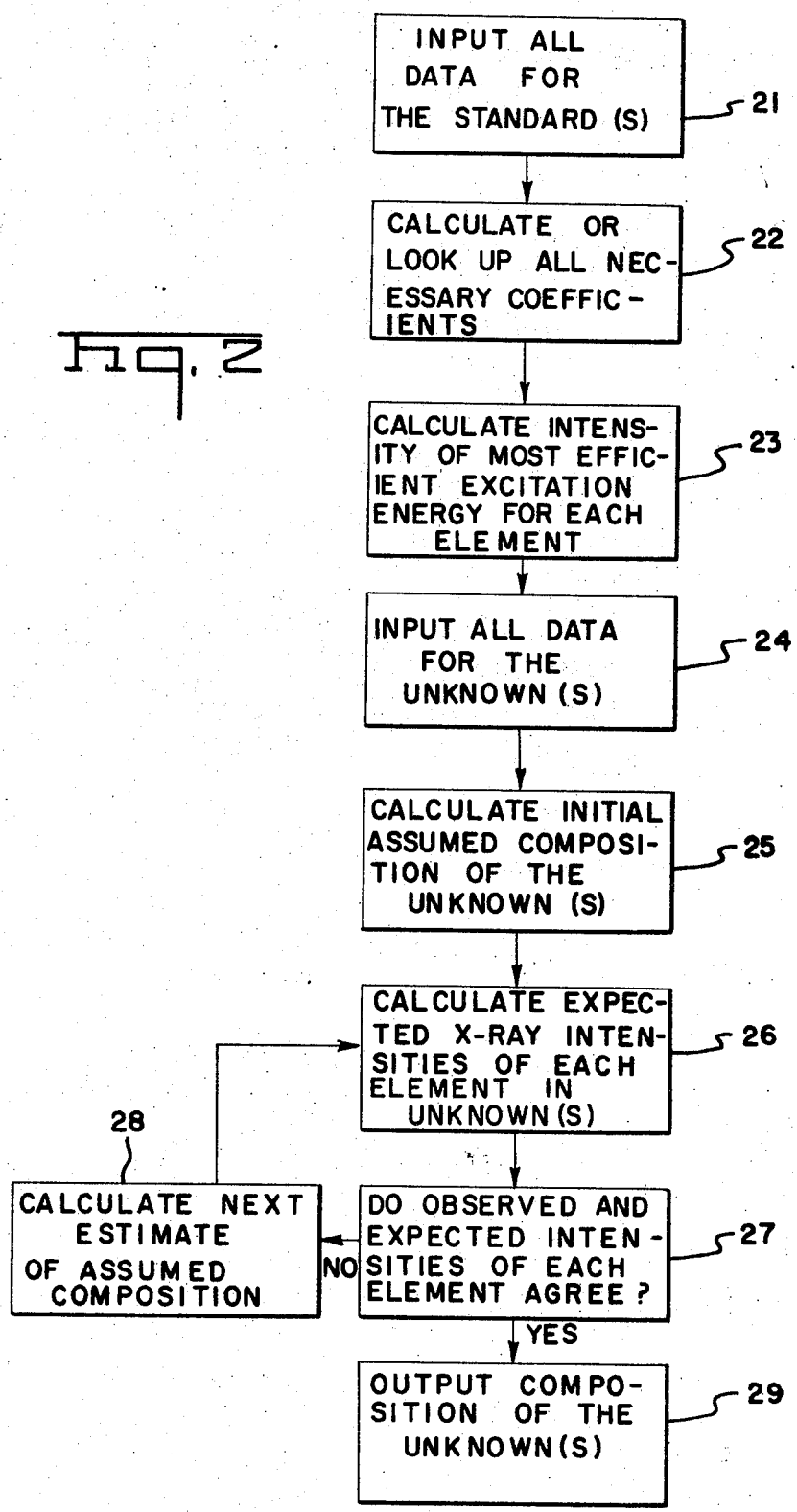
FIG. 2 is a flow sheet depicting the process of this invention.

As an example, assume there is a known mixture (standard) of elements A and B. This mixture is irradiated to obtain a measurement of the $K\alpha_{1,2}$ X-ray emission line of both elements. In accordance with this invention it is assumed that the energies of the incident X-rays which produced each line are just above the K absorption edge of each line. Under this assumption, $K\alpha_{1,2}$ X-rays are emitted most efficiently. The step of irradiating the sample and gathering the intensity data is indicated at step 21 in the flow sheet of FIG. 2 which depicts the invention.

With the aforementioned assumption, the intensity of the most efficient excitation energy for each element can be computed. This step is indicated at step 23 in the flow sheet. The computation is carried out in accordance with $$I_i^\circ = \frac{I_i (\text{Sec } \theta_1 \mu_s^P + \text{Sec } \theta_2 \mu_s^i)}{\text{Sec } \theta_2 \mu_i^P W_i \frac{K_i-1}{K_i} \Omega_i R_i} \quad (1)$$

where $I_i^\circ$ is the first order approximation of the intensity of the most efficient excitation energy of the $i$th element, $I_i$ is the observed X-ray intensity for the ith element, $\theta_1$ is the angle of incidence of the irradiating energy, $\theta_2$ is the angle at which characteristic X-rays are observed, $\mu_s^P$ is the mass absorption coefficient of the sample for the most efficient X-rays, $\mu_s^i$ is the mass absorption coefficient of the sample for the ith radiation, $\mu_i^P$ is the mass absorption coefficient of the $i$th element for the most efficient X-rays, $W_i$ is the weight fraction of element $i$, $K_i$ is the absorption edge jump ratio for the $i$th element, $\Omega_i$ is the fluorescent yield of the ith element, and $R_i$ is the fraction of the characteristic X-rays in the analyzed line's series.

The foregoing coefficients are all well-defined in X-ray spectrometry. The calculation of, or table look-up of, these coefficients are indicated by step 22 of the flow sheet. A few brief comments on these coefficients will be helpful. The weight fraction of each element $W_i$ is the decimal fraction which varies between 0. and 1. The fluorescent yield $\Omega_i$ is the efficiency with which X-rays are produced relative to auger electrons. When a K electron is ejected, another electron takes its place. However, instead of emitting X-rays, an electron may be ejected from the excited atom. When the probability of electron ejection is high there is not a high yield of X-rays. The fluorescent yield of the element, $\Omega_i$, is described more fully on page 36 of the aforementioned text. The fraction $R_i$ can best be explained with reference to an example. For aluminum, there are two principal K lines, aluminum $K\alpha_{1,2}$ and aluminum $K\beta_1$. Assuming that $K\alpha_{1,2}$ is the line of interest, $R_i$ is the fraction of X-rays in the $K\alpha_{1,2}$ line relative to the total number of X-rays in the K emission series for aluminum. The mass absorption coefficients $\mu_s^P$, $\mu_s^i$, and $\mu_i^P$ are a measure of the probability that an X-ray of energy P will be absorbed by the sample, an X-ray of energy $i$ will be absorbed by the sample, and an X-ray of energy P will be absorbed by the ith element respectively. These data are readily available.

The absorption edge jump ratio $K_i$ is a measure of the fraction of X-ray energy absorbed by element i that is responsible for the ejection of electrons from the energy level connected with the observed characteristic X-rays. In this example, assume that the sample is 20% A, therefore the weight fraction $W_A$ is 0.20 and $W_B$ is 0.80.

The computation just performed at step 23 in the flow sheet in accordance with equation (1) will produce the intensity of the most efficient excitation energy for element A. This computed value is used in equation (2) given below, in conjunction with an assumed composition of the unknown (step 25) to compute the expected X-ray intensity $I_A^{calc}$ for element A in the unknown.

$$I_i^{calc} = \frac{\text{Sec } \theta_2 I_i^\circ \mu_i^P \frac{W_i K_i - 1}{K_i} \Omega_i R_i}{\text{Sec } \theta_1 \mu_s^P + \text{Sec } \theta_2 \mu_s^i}$$

$$+ \frac{1}{2 \cos \theta_2} \sum_{j=1}^{n} \frac{Q_j^P Q_j^i I_j^\circ}{\mu_s^P \text{Sec } \theta_1 + \mu_s^i \text{Sec } \theta_2}$$

$$\left\{ \frac{\cos \theta_2}{\mu_s^i} 1N\left[1 + \frac{\mu_s^i \text{Sec } \theta_2}{\mu_s^i}\right] + \frac{\cos \theta_1}{\mu_s^P} 1N\left[1 + \frac{\mu_s^P \text{Sec } \theta_1}{\mu_s^i}\right] \right\} \quad (2)$$

where $$Q_k^i = \mu_k^i W_k \frac{K_k - 1}{K_k} \Omega_k R_k$$

where the remaining symbols are as previously defined. This calculated intensity $I_A^{calc}$ is compared with the observed intensity $I_A$. Then, the weight fraction $W_A$ of element A in equation (2) is adjusted by an iterative procedure (steps 26, 27, and 28) until $I_A^{calc}$ matches $I_A$. When this is obtained the value of $W_A$ is the best estimate of the weight fraction of element A. The same procedure is followed penecontemporaneously to obtain the weight fraction of element B. Iterative adjustment of elements A and B continues until the observed intensities of A and B agree (step 29).

While the invention is useful for simple examples such as that described above it is even more useful for complex mixtures. Its utility is best demonstrated with reference to an actual example of the analysis of four 13 element mixtures (Table 1).

TABLE 1.—COMPARISON OF WET-CHEMICAL AND X-RAY EMISSION ANALYSIS OF FOUR 13 COMPONENT MIXTURES. VALUES ARE IN WEIGHT PERCENT OXIDES.

| Component | Sample 1 | | Sample 2 | | Sample 3 | | Sample 4 | |
|---|---|---|---|---|---|---|---|---|
| | Wet-chem | X-ray | Wet-chem | X-ray | Wet-chem | X-ray | Wet-chem | X-ray |
| $SiO_2$ | 72.92 | 72.88 | 72.03 | 72.05 | 70.51 | 70.26 | 73.30 | 73.46 |
| $Al_2O_3$ | 1.50 | 1.59 | 0.35 | 0.34 | 3.14 | 3.32 | 1.20 | 1.22 |
| $Fe_2O_3$ | 0.045 | 0.042 | 0.17 | 0.18 | 0.01 | 0.01 | 0.115 | 0.111 |
| $CaO$ | 4.93 | 4.97 | 11.40 | 11.39 | 11.05 | 10.96 | 8.20 | 8.19 |
| $MgO$ | 3.47 | 3.41 | 2.35 | 2.28 | 0.34 | 0.35 | 3.40 | 3.27 |
| $Na_2O$ | 16.54 | 16.49 | 13.35 | 13.31 | 12.45 | 12.45 | 13.40 | 13.28 |
| $K_2O$ | 0.32 | 0.33 | 0.03 | 0.02 | 2.23 | 2.29 | 0.15 | 0.14 |
| $SO_3$ | 0.20 | 0.20 | 0.33 | 0.29 | 0.19 | 0.19 | 0.25 | 0.23 |
| $BaO$ | 0.01 | 0.003 | 0.01 | 0.005 | 0.14 | 0.11 | 0.01 | 0.01 |
| $As_2O_3$ | 0.00 | 0.003 | 0.00 | 0.00 | 0.00 | 0.003 | 0.00 | 0.00 |
| $TiO_2$ | 0.20 | 0.02 | 0.10 | 0.10 | 0.13 | 0.13 | 0.02 | 0.02 |
| $SrO$ | 0.03 | 0.03 | 0.02 | 0.01 | 0.03 | 0.02 | 0.08 | 0.08 |
| $ZrO_2$ | 0.04 | 0.04 | 0.02 | 0.02 | 0.01 | 0.01 | 0.01 | 0.01 |

The analysis produced as accurate results as wet chemical analysis of the mixtures. However, the X-ray spectrometric technique of this invention was performed in approximately 200 seconds per element whereas the wet chemical analysis requires very much more time to complete. Analysis in accordance with this invention can be performed just as fast as all the X-ray intensity measurements can be obtained from the unknown and the standard(s).

Note that the most efficient excitation energy of each element in the samples is slightly greater than the energy of the absorption edge of the measured X-ray emission line of each element. Moreover, any assumed excitation energy greater than the energy of the absorption edge of the measured X-ray emission line of each element which might be used in this process is within the scope of this invention.

Not all elements contained in the samples need be determined by X-ray emission techniques. Any one element contained in the samples may be determined by the difference from 100 percent, and any number of elements may be determined by other analytical techniques, in which case the weight fraction of those elements are employed in the equations (1) and (2), but are not altered in the iterative adjustment procedure.

The use of any coefficient, parameter, or quantity which is related in a concise mathematical way to any coefficient, parameter, or quantity described herein is considered to be identical to the coefficient, parameter, or quantity for the purposes of the computations described herein.

Higher order approximations to the intensity of the most efficient excitation energy may be used and are considered to be within the scope of this invention.

While the present invention can be practiced in a number of ways, one particularly suitable technique is by way of a properly programmed digital computer. One computer which will carry out the invention is given hereinafter. This particular program — CORSET — is in Fortran.

```
00010  C     COMPUTER ORIENTED X-RAY SPECTROGRAPHIC EMISSION TRANSLATOR
00020  C
00030  C       *******  *******  *******  *******  *******  ********
00040  C       *******  *******  *******  *******  *******  ********
00050  C       **       **   **  **  **   **       **            **
00060  C       **       **   **  *******  *******  *******       **
00070  C       **       **   **  ** **         **       **       **
00080  C       *******  *******  **   **  *******  *******       **
00090  C       *******  *******  **   **  *******  *******       **
00100  C
00110  C
00120  C     A FORTRAN PROGRAM FOR THE THEORETICAL INTERPRETATION
00130  C     OF QUANTITATIVE X-RAY SPECTROGRAPHIC EMISSION DATA
00140  C     ****************************************************************
00150  C     THIS IS THE BATCH ORIENTED VERSION
00160  C     UNIVAC 1108 VERSION ALSO RUNS ON IBM/360 BY CHANGING CARDS IN
00170  C     SUBROUTINES MASABS AND CAC
00180  C
00190  C     TINTO(I,J) INTENSITY FOR I TH COMPONENT AND J TH SAMPLE
00200  C
00210  C     STDINT(I) IS INTENSITY MEASURED ON STANDARD FOR I TH COMPONENT
00220  C     SET TO ZERO IF THE ELEMENT WAS NOT DETERMINED BY X-RAY
00230  C
00240  C     TIME(I,J) COUNTING TIME FOR THE I TH COMPONENT AND J TH SAMPLE
00250  C     ZERO MEANS THE ELEMENT WAS NOT ANALYZED BY X-RAY
00260  C
00270  C     FONINT(I) PHONEY INTENSITY FOR I TH COMPONENT
00280  C     DETERMINED BY BACK CALCULATION FROM OBSERVED INTENSITY OF
00290  C     I TH COMPONENT...VALID ONLY FOR I TH COMPONENT
00300  C
00310  C     LINE(I)    LINE TYPE ANALIZED FOR I TH COMPONENT
00320  C     ANALYZED K ALPHA LINES MUST STOP AT Z=38
00330  C     CHANGE TO L LINES
00340  C     THIS IS A SUPER CRITICAL REGION, WHEN CHANGING TO L-LINES
00350  C     MAKE SURE THE TUBE VOLTAGE IS LOWER THAN THE EXCITATION POTENTIAL
00360  C     OF THE K-EDGE OF THE ELEMENT BEING ANALYZED, ERRORS IN THE
00370  C     FLUORESCENCE CORRECTION  CAN AND PROBABLY WILL OCCUR IF THIS
00380  C     CONDITION IS NOT MET BECAUSE ABS. COEFFICIENTS ARE UNKNOWN
00390  C
00400  C     KTUBE(I)   TUBE TYPE USED TO ANALIZE I TH COMPONENT
00410  C     ASSIGNED IN SUBROUTINE ASSIGN  AS THE KA1 LINE WHOSE ENERGY IS
00420  C     JUST GREATER THAN THE ABS. EDGE OF THE ANALYZED LINE
00430  C     IRRESPECTIVE OF THE ANALYZED LINE'S SERIES
00440  C
00450  C     ILINE(I)   LINE TYPE USED TO ANALIZE I TH COMPONENT
00460  C     ALWAYS A KA1 LINE IN THIS VERSION
00470  C
00480  C     AKV(I)     TUBE VOLTAGE
00490  C
00500  C     THETA1     ANGLE OF INCIDENCE
00510  C
00520  C     THETA2     ANGLE AT WHICH INTENSITIES FROM THE SAMPLE ARE MEASURED
00530  C
00540  C     ICOMP      NUMBER OF COMPONENTS
00550  C
00560  C     ISAMP IS NUMBER OF STANDARDS
00570  C     MUST EQUAL THE NUMBER OF COMPONENTS   IDENTICAL STANDARDS FOR ANY
00580  C     OR ALL  COMPONENTS IS OK
00590  C
00600  C     ISKIP EQUAL TO 1 MEANS DO NOT MAKE FLUORESCENCE CORRECTIONS
```

D-4996

```
00610   C
00620   C
00630           DIMENSION OUT(20), COEFF(900), CCC(30)
00640           COMMON /ONE/ TITLE(18),VALUE(20,20),ANAME(20),NUMBER(20),WTFRC(20)
00650          1,EXRINT(20),WTFRCN(20)
00660           COMMON /TWO/ WGHT(100),ALIST(100),LIST(100),ISAMP,ICOMP
00670           COMMON /THREE/ ENERG1(92),ENERG2(92),ENERG3(92),ENERG4(92),ENERG5(
00680          192),ENERG6(92),EDGE1(92),EDGE2(92),EDGE3(92),EDGE4(92),EDGE5(92),R
00690          2ATIO1(92),RATIO2(92),RATIO3(92),RATIO4(92),RATIO5(92),NLINE(7),EDG
00700          3E(20),ENERG7(92)
00710           COMMON /FOUR/ CATION(20),ANION(20),AMOWT(20),ATWTCA(20),ATWTAN(20)
00720          1,DIV(20),FNOCAT(20),FNOANI(20),BMAG(20),ATWTEL(25),ELEM(25),AA(20)
00730          2,BB(20),NOEL(25),ADIV(20),AMAG(30),QUANT,IOUT(10),NOCAT(20),NOANI(
00740          320),NOCOMP,NAN,NCAT,INCODE,IO,KSQ,ISAVE(10)
00750           COMMON /FIVE/ STDINT(20),TINTO(20,20),TIME(20,20),FONINT(20),FACTO
00760          1R(3,160),LINE(20),KTUBE(20),ILINE(20),AKV(20),AMUPE(20,20),AMUEE(6
00770          2,20,20)
00780   1       KOUNT=0
00790   C       GET WEIGHT FRACTION OF COMPONENTS IN THE STANDARDS
00800           CALL CAC(5,KOUNT)
00810           THETA1=24./57.29578
00820           THETA2=55./57.29578
00830           READ (5,30) (LINE(I),AKV(I),I=1,ICOMP)
00840           READ (5,31) (STDINT(I),I=1,ICOMP)
00850           DO 2 I=1,ICOMP
00860           CCC(I)=0.0
00870   2       READ (5,32) ((TINTO(I,J),TIME(I,J)),J=1,ISAMP)
00880           READ(5,39) ISKIP
00890           CALL DTIME
00900   C
00910   C       DIVIDE OBSERVED COUNTS BY COUNTS FROM THE STANDARD
00920   C
00930           K=0
00940           DO 3 I=1,900
00950           COEFF(I)=0.0
00960   3       CONTINUE
00970           DO 4 I=1,ICOMP
00980           DO 4 J=1,ISAMP
00990           IF (STDINT(I).EQ.0.0) GO TO 4
01000           IF (TIME(I,J).EQ.0.0) GO TO 4
01010           TINTO(I,J)=TINTO(I,J)/STDINT(I)
01020           IF (I.NE.J) GO TO 4
01030           K=K+1
01040           CCC(K)=TINTO(I,J)
01050   4       CONTINUE
01060           KALL=K
01070           CALL ASSIGN
01080           CALL TERMS(1,0,0,0)
01090           CALL MASABS
01100           COST1=COS(THETA1)
01110           COST2=COS(THETA2)
01120           KCNT=0
01130           DO 6 I=1,ISAMP
01140           IF (STDINT(I).EQ.0.0) GO TO 6
01150           KCNT=KCNT+1
01160           II=LINE(I)
01170           SUM1=0.
01180           SUM2=0.
01190   C
01200   C       VALUE(K,I) IS THE WT. PCT ELEMENTS RETURNED FROM SUBROUTINE CAC
```

```
01210      C
01220             DO 5 K=1,ICOMP
01230      C
01240      C      CALCULATE MASS ABS. COEFF. OF THE SAMPLE FOR THE PRIMARY X-RAYS
01250      C      AND THE ANALYZED LINES
01260      C
01270             SUM1=SUM1+VALUE(K,I)*AMUPE(I,K)
01280             SUM2=SUM2+VALUE(K,I)*AMUEE(II,I,K)
01290    5        CONTINUE
01300      C
01310      C      ANOTHM IS THE MASS ABS. COEFF. OF THE ELEMENT BEING ANALYZED FOR
01320      C      THE PRIMARY RADIATION USED TO ANALYZE IT
01330      C
01340             ANOTHM=AMUPE(I,I)
01350      C
01360      C      FORM DIAGONAL FOR ORIGINAL INTENSITY MATRIX
01370      C
01380             PART1=FACTOR(1,I)*FACTOR(2,I)*FACTOR(3,I)*VALUE(I,I)*ANOTHM/COST2
01390             PART2=SUM1/COST1+SUM2/COST2
01400             JJJ=(KCNT-1)*KALL+KCNT
01410             COEFF(JJJ)=PART1/PART2
01420    6        CONTINUE
01430             KOUNT=-1
01440             KCNT=0
01450             DO 8 J=1,ICOMP
01460             DO 7 I=1,ICOMP
01470             WTFRC(I)=VALUE(I,J)
01480    7        CONTINUE
01490             IF(ISKIP.EQ.1) GO TO 8
01500             DO 8 I=1,ICOMP
01510             IF (J.NE.I) GO TO 8
01520             IF (STDINT(J).EQ.0.0) GO TO 8
01530             KCNT=KCNT+1
01540             CALL FLUCOR(J,I,COST1,COST2,KOUNT,KALL,COEFF,KCNT)
01550    8        CONTINUE
01560             CALL SIMQ(COEFF,CCC,KALL,ISING)
01570             IF (ISING.EQ.1) GO TO 26
01580             K=0
01590             DO 9 I=1,ISAMP
01600             FONINT(I)=0.0
01610             IF (STDINT(I).EQ.0.0) GO TO 9
01620             K=K+1
01630             FONINT(I)=CCC(K)
01640    9        CONTINUE
01650      C
01660      C      ISAMPL IS THE NUMBER OF SAMPLES BEING ANALYZED IN THIS RUN
01670      C
01680             READ (5,33) ISAMPL
01690      C
01700      C      READ INTENSITY OF MASTER STANDATD FOR EACH ELEMENT --STDINT
01710      C      THE INTENSITY OF EACH LINE AND THE COUNTING TIME
01720      C
01730      C      INTENSITY AND TIME BOTH POSITIVE MEANS THE ELEMENT WAS DETERMINED
01740      C      BY X-RAY MEASUREMENT
01750      C
01760      C      INTENSITY AND TIME BOTH ZERO MEANS THE ELEMENT IS TO BE DETERMINED
01770      C      BY DIFFERENCE FROM  WEIGHT FRACTION 1.0
01780      C
01790      C      INTENSITY POSITIVE AND TIME ZERO MEANS THE INTENSITY VALUE IS WT.
01800      C      PCT. ELEMENT DETERMINED INDEPENDENTLY
```

D-4996

```
01810   C        IF WT. PERCENT IS ACTUALLY ZERO, ENTER A VERY SMALL VALUE
01820   C
01830            READ (5,31) (STDINT(I),I=1,ICOMP)
01840            DO 10 I=1,ICOMP
01850   10       READ (5,32) ((TINTO(I,J),TIME(I,J)),J=1,ISAMPL)
01860            CALL DTIME
01870            DO 11 I=1,ICOMP
01880            DO 11 J=1,ISAMPL
01890            IF (TIME(I,J).EQ.0.0) GO TO 11
01900   C
01910   C        DIVIDE INTENSITIES OF EACH ELEMENT BY INTENSITIES FROM STANDARD
01920   C
01930            TINTO(I,J)=TINTO(I,J)/STDINT(I)
01940   11       CONTINUE
01950   C
01960   C        SET UP OUTPUT PARAMETERS FOR ANALYZED SAMPLES
01970   C
01980            INCODE=5
01990            NOSAMP=1
02000            READ (5,34) NOCOMP,NAN,NCAT,IFLAG
02010            READ (5,35) (IOUT(I),I=1,10)
02020            DO 12 I=1,10
02030            ISAVE(I)=IOUT(I)
02040   12       CONTINUE
02050            IF (IFLAG.EQ.0) GO TO 14
02060            DO 13 I=1,NOCOMP
02070            READ (5,36) CATION(I),NOCAT(I),ANION(I),NOANI(I),DIV(I)
02080   13       CONTINUE
02090   C
02100   C        START LOOP FOR SAMPLE(I)
02110   C
02120   14       DO 25 J=1,ISAMPL
02130   C        GET INITAL ESTIMATES OF CONCENTRATIONS
02140            KOUNT=0
02150            CALL CONC(KOUNT,J)
02160   15       WRITE (6,27) KOUNT
02170            DO 16 I=1,ICOMP
02180            KK=NUMBER(I)
02190            OUT(I)=ALIST(KK)
02200   16       CONTINUE
02210            WRITE (6,28) (OUT(I),I=1,ICOMP)
02220            WRITE (6,29) (WTFRC(II),II=1,ICOMP)
02230            DO 18 I=1,ICOMP
02240            EXRINT(I)=0.0
02250            IF (TIME(I,J).EQ.0.0) GO TO 18
02260            SUM1=0.
02270            SUM2=0.
02280   C
02290   C        CALCULATE ABS. COEFF. FROM ESTIMATE OF COMPOSITION
02300   C
02310            DO 17 K=1,ICOMP
02320            II=LINE(I)
02330            SUM1=SUM1+WTFRC(K)*AMUPE(I,K)
02340            SUM2=SUM2+WTFRC(K)*AMUEE(II,I,K)
02350   C
02360   C        CALCULATE EXPECTED INTENSITIES
02370   C
02380   17       CONTINUE
02390            DENOM=SUM1/COST1+SUM2/COST2
02400            QIP=AMUPE(I,I)*FACTOR(1,I)*FACTOR(2,I)*FACTOR(3,I)*WTFRC(I)
```

```
02410        EXRINT(I)=(QIP*FONINT(I)/COST2)/DENOM
02420   C
02430   C    GET INTENSITY DUE TO FLUORESCENT INTERACTIONS
02440   C
02450        IF(ISKIP.EQ.1) GO TO 18
02460        CALL FLUCOR(J,I,COST1,COST2,KOUNT,KALL,COEFF,0)
02470   18   CONTINUE
02480   C
02490   C    BEGIN HYPERBOLIC APPROXIMATION OF WT. FRACTION COMPONENTS
02500   C    DETERMINED BY X-RAY
02510   C
02520        DO 20 I=1,ICOMP
02530        WTFRCN(I)=WTFRC(I)
02540        IF (TIME(I,J).EQ.0.0) GO TO 20
02550        IF (TINTO(I,J).EQ.0.0) GO TO 19
02560        WTFRC(I)=TINTO(I,J)*WTFRCN(I)/EXRINT(I)
02570        GO TO 20
02580   19   WTFRC(I)=0.0
02590   20   CONTINUE
02600        KOUNT=KOUNT+1
02610        CALL CONC(KOUNT,J)
02620   C
02630   C    TEST FOR CONVERGENCE
02640        KMARK=0
02650        DO 21 I=1,ICOMP
02660        IF(STDINT(I).EQ.0.0) GO TO 21
02670        DIFF=ABS(TINTO(I,J)-EXRINT(I))
02680        IF (DIFF.LE..001) GO TO 21
02690        KMARK=1
02700   21   CONTINUE
02710        IF (KOUNT.GT.10) GO TO 22
02720        IF (KMARK.NE.0) GO TO 15
02730        GO TO 23
02740   22   WRITE (6,37)
02750   23   DO 24 I=1,ICOMP
02760        BMAG(I)=WTFRC(I)*100.
02770   24   CONTINUE
02780        CALL CAC(5,KOUNT)
02790   25   CONTINUE
02800        GO TO 1
02810   C
02820   26   WRITE (6,38)
02830        CALL EXIT
02840   C
02850   27   FORMAT ('X','WEIGHT FRACTION OF COMPONENTS AFTER ITERATION',2X,I2)
02860   28   FORMAT ('X',2X,20(A4,4X))
02870   29   FORMAT ('X',20(F5.3,3X))
02880   30   FORMAT (8(A3,2X,F5.0),/,8(A3,2X,F5.0))
02890   31   FORMAT (10F8.4)
02900   32   FORMAT (8F10.5)
02910   33   FORMAT (I5)
02920   34   FORMAT (4(I2,2X))
02930   35   FORMAT (10I1)
02940   36   FORMAT (2(A2,I1),2X,F7.0)
02950   37   FORMAT ('X',' MORE THAN 10 ITERATIONS-- SKIPPING TO NEXT SAMPLE')
02960   38   FORMAT ('X','SINGULAR MATRIX FOR ORIGINAL INTENSITIES')
02970     39 FORMAT(I1)
02980        END
02990        SUBROUTINE FLUCOR(J,II,COST1,COST2,KOUNT,KALL,COEFF,KCNT)
03000   C    ROUTINE TO FIND AND CALCULATE ALL FLUORESCENT INTERACTIONS
```

```
03010            DIMENSION INTACT(7,20,20), JLINE(140), NAT(140)
03020            DIMENSION COEFF(902)
03030            COMMON /ONE/ TITLE(18),VALUE(20,20),ANAME(20),NUMBER(20),WTFRC(20)
03040           1,EXRINT(20),WTFRCN(20)
03050            COMMON /TWO/ WGHT(100),ALIST(100),LIST(100),ISAMP,ICOMP
03060            COMMON /THREE/ ENERG1(92),ENERG2(92),ENERG3(92),ENERG4(92),ENERG5(
03070           192),ENERG6(92),EDGE1(92),EDGE2(92),EDGE3(92),EDGE4(92),EDGE5(92),R
03080           2ATIO1(92),RATIO2(92),RATIO3(92),RATIO4(92),RATIO5(92),NLINE(7),EDG
03090           3E(20),ENERG7(92)
03100            COMMON /FIVE/ STDINT(20),TINTO(20,20),TIME(20,20),FONINT(20),FACTO
03110           1R(3,160),LINE(20),KTUBE(20),ILINE(20),AKV(20),AMUPE(20,20),AMUEE(6
03120           2,20,20)
03130            IF (KOUNT.NE.-1) GO TO 3
03140            IF (J.NE.1) GO TO 3
03150            DO 1 I=1,7
03160            DO 1 K=1,ICOMP
03170            DO 1 L=1,ICOMP
03180            INTACT(I,K,L)=0
03190     1      CONTINUE
03200     C
03210     C      DETERMINE ALL POSSIBLE FLUORESCENT INTERACTIONS CONSISTENT WITH
03220     C      ABSORPTION EDGES AND TUBE VOLTAGES FOR KB, KA, LB1, LB2, LA1,MB, M
03230     C
03240            DO 2 I=1,ICOMP
03250            DO 2 K=1,ICOMP
03260            KK=NUMBER(K)
03270            IF ((ENERG2(KK).GT.EDGE(I)).AND.(AKV(I).GT.(EDGE1(KK))/1000.)) INT
03280           1ACT(1,I,K)=K
03290            IF ((ENERG1(KK).GT.EDGE(I)).AND.(AKV(I).GT.(EDGE1(KK))/1000.)) INT
03300           1ACT(2,I,K)=K
03310            IF ((ENERG4(KK).GT.EDGE(I)).AND.(AKV(I).GT.(EDGE2(KK))/1000.)) INT
03320           1ACT(3,I,K)=K
03330            IF ((ENERG5(KK).GT.EDGE(I)).AND.(AKV(I).GT.(EDGE3(KK))/1000.)) INT
03340           1ACT(4,I,K)=K
03350            IF ((ENERG3(KK).GT.EDGE(I)).AND.(AKV(I).GT.(EDGE3(KK))/1000.)) INT
03360           1ACT(5,I,K)=K
03370            IF ((ENERG7(KK).GT.EDGE(I)).AND.(AKV(I).GT.(EDGE4(KK))/1000.)) INT
03380           1ACT(6,I,K)=K
03390            IF ((ENERG6(KK).GT.EDGE(I)).AND.(AKV(I).GT.(EDGE5(KK))/1000.)) INT
03400           1ACT(7,I,K)=K
03410     2      CONTINUE
03420     C
03430     C      SKIP IF COMPONENT WAS NOT DETERMINED BY X-RAY
03440     3      IF (TIME(II,J).EQ.0.0) GO TO 21
03450     C
03460     C      NINT IS THE TOTAL NUMBER OF FLUORESCENT INTERACTIONS FOR THE
03470     C      II TH COMPONENT
03480     C      JLINE IS THE X-RAY LINE OF THE NAT COMPONENT CAUSING FLUORESCENCE
03490     C      OF THE II TH COMPONENT
03500     C
03510            DO 4 KK=1,140
03520            NAT(KK)=0
03530     4      CONTINUE
03540            NINT=0
03550            DO 5 KK=1,7
03560            DO 5 K=1,ICOMP
03570     C
03580     C      INTACT(I,J,K) SPECIFIES THE I TH LINE OF COMPONENT K  FLUORESCING
03590     C      THE J TH COMPONENT
03600     C
```

```
03610           IF (INTACT(KK,II,K),EQ,0) GO TO 5
03620           NINT=NINT+1
03630           JLINE(NINT)=KK
03640           NAT(NINT)=INTACT(KK,II,K)
03650     5     CONTINUE
03660           IF (NINT,EQ,0) GO TO 21
03670           DO 13 KK=1,NINT
03680           MM=JLINE(KK)
03690           GO TO (6,7,8,9,10,11,12), MM
03700     6     JLINE(KK)=2
03710           GO TO 13
03720     7     JLINE(KK)=1
03730           GO TO 13
03740     8     JLINE(KK)=4
03750           GO TO 13
03760     9     JLINE(KK)=5
03770           GO TO 13
03780    10     JLINE(KK)=3
03790           GO TO 13
03800    11     JLINE(KK)=7
03810           GO TO 13
03820    12     JLINE(KK)=6
03830    13     CONTINUE
03840           IF (KOUNT,NE,-1) GO TO 15
03850           WRITE (6,22) II
03860           DO 14 I=1,NINT
03870           JJ=JLINE(I)
03880           KK=NAT(I)
03890           LL=NUMBER(KK)
03900           WRITE (6,23) NLINE(JJ),KK,ALIST(LL)
03910    14     CONTINUE
03920     C
03930     C     FLUSUM IS THE SUM OF EXTRA INTENSITY DUE TO FLUORESCENCE
03940     C
03950    15     FLUSUM=0.0
03960     C
03970     C     BEGIN LOOP OVER ALL INTERACTIONS(NINT)
03980           DO 19 KK=1,NINT
03990           YETCH=0.0
04000     C
04010     C     SUM1= MU OF SAMPLE FOR RADIATION  USED TO FLUORESCE J TH COMPONENT
04020     C     SUM2= MU OF SAMPLE FOR I TH COMPONENT BEING ANALYZED
04030     C     SUM3= MU OF SAMPLE FOR J TJ RADIATION FLUORESCENG I TH COMPONENT
04040     C
04050           SUM1=0.0
04060           SUM2=0.0
04070           SUM3=0.0
04080           LL=ICOMP+KK
04090           JJ=NAT(KK)
04100           JJJ=JLINE(KK)
04110           NN2=ILINE(II)
04120           IF (NN2,GT,4) NN2=NN2-1
04130           NN3=JLINE(KK)
04140           IF (NN3,GT,4) NN3=NN3-1
04150           DO 16 I=1,ICOMP
04160     C
04170     C     CALCULATE MASS ABSORPTION COEFFICIENTS (MU) OF SAMPLE
04180     C
04190           IF (AMUPE(JJ,I),EQ,0.0,OR,AMUEE(NN2,II,I),EQ,0.0,OR,AMUEE(NN3,JJ,I
04200          1),EQ,0.0) GO TO 19
```

```
04210            SUM1=SUM1+WTFRC(I)*AMUPE(JJ,I)
04220            SUM2=SUM2+WTFRC(I)*AMUEE(NN2,II,I)
04230            SUM3=SUM3+WTFRC(I)*AMUEE(NN3,JJ,I)
04240      16    CONTINUE
04250   C
04260   C        SET FACTORS FOR JUMP RATIOS, FLUOR, YIELD, RATIOS OF INTENSITIES
04270   C
04280            CALL TERMS(2,NINT,JLINE,NAT)
04290            QJF=AMUPE(JJ,JJ)*WTFRC(JJ)*FACTOR(1,LL)*FACTOR(2,LL)*FACTOR(3,LL)
04300            QIJ=AMUEE(NN3,JJ,II)*WTFRC(II)*FACTOR(1,II)*FACTOR(2,II)*FACTOR(3,
04310           1II)
04320            DENOM=(SUM1/COST1)+(SUM2/COST2)
04330            IF (KOUNT.EQ.-1) GO TO 17
04340            FACT1=(QJF*QIJ*FONINT(JJ))/DENOM
04350            GO TO 18
04360      17    FACT1=QJF*QIJ/DENOM
04370      18    PART1=(COST2/SUM2)*ALOG(1.0+((SUM2/COST2)/SUM3))
04380            PART2=(COST1/SUM1)*ALOG(1.0+((SUM1/COST1)/SUM3))
04390            FACT2=PART1+PART2
04400            YETCH=FACT1*FACT2/(2.0*COST2)
04410            IF (KOUNT.NE.-1) GO TO 24
04420   C
04430   C        ACCUMULATE OFF DIAGIONAL TERMS FOR ORIGINAL INTENSITY MATRIX
04440   C
04450            INDEX=KALL*(KCNT-1)+JJ
04460            WRITE(6,26) YETCH,INDEX
04470      26    FORMAT('X',F15.10,2X,I3)
04480            COEFF(INDEX)=COEFF(INDEX)+YETCH
04490            GO TO 19
04500      24    IF(YETCH.LE..005*EXRINT(II)) GO TO 19
04510            FLUSUM=FLUSUM+YETCH
04520      19    CONTINUE
04530            IF(KOUNT.EQ.-1) RETURN
04540            FLURAY=FLUSUM
04550            WRITE (6,25) FLURAY
04560            EXRINT(II)=EXRINT(II)+FLURAY
04570      21    RETURN
04580   C
04590      22    FORMAT ('X','FLUORESCENT INTERACTIONS FOR COMPONENT',2X,I3,//)
04600      23    FORMAT ('X',A3,'LINE OF',2X,'COMPONENT',I3,2X,A4)
04610      25    FORMAT ('X',' FLURAY=',2X,F10.5)
04620            END
04630            SUBROUTINE HELP (A,L)
04640   C
04650   C        INTERPOLATES MASS ABSORPTION COEFFICIENTS WHEN THE TABLE VALUE
04660   C        IS ZERO STRAIGHT LINE FIT MADE FROM POINTS ABOVE AND BELOW
04670   C        MAY RETURN A ZERO VALUE IF EXTRAPOLATION IS TOO FAR
04680   C
04690            DIMENSION A(92), ABOVE(3), BELOW(3), IDA(3), IDB(3)
04700            IUP=0
04710            LOW=0
04720            DO 2 I=1,8
04730            I1=L+I
04740            I2=L-I
04750            IF(I1.GT.92.OR.I2.LT.1) GO TO 2
04760            IF (IUP.GE.3) GO TO 1
04770            IF (A(I1).EQ.0.) GO TO 1
04780            IUP=IUP+1
04790            IDA(IUP)=I1
04800            ABOVE(IUP)=A(I1)
```

```
04810   1       IF (LOW.GE.3) GO TO 2
04820           IF (A(I2).EQ.0.) GO TO 2
04830           LOW=LOW+1
04840           IDB(LOW)=I2
04850           BELOW(LOW)=A(I2)
04860   2       CONTINUE
04870           IF (IUP.NE.0.OR.LOW.NE.0) GO TO 3
04880           RETURN
04890   3       IDA1=IDA(1)
04900           IDB1=IDB(1)
04910           IF (IUP.EQ.0) GO TO 4
04920           IF (LOW.EQ.0) GO TO 6
04930           A(L)=A(IDB1)+(L-IDB1)*(A(IDA1)-A(IDB1))/(IDA1-IDB1)
04940           RETURN
04950   4       IF (LOW.GT.1) GO TO 5
04960           A(L)=BELOW(1)
04970           RETURN
04980   5       FACTOR=(BELOW(1)-BELOW(2))/(IDB(1)-IDB(2))
04990           A(L)=FACTOR*(L-IDB1)+A(IDB1)
05000           RETURN
05010   6       IF (IUP.GT.1) GO TO 7
05020           A(L)=ABOVE(1)
05030           RETURN
05040   7       FACTOR=(ABOVE(2)-ABOVE(1))/(IDA(2)-IDA(1))
05050           A(L)=FACTOR*(L-IDA1)+A(IDA1)
05060           RETURN
05070           END
05080           BLOCK DATA
05090   C
05100   C       CONTAINS ALL DATA NECESSARY EXCEPT MASS ABS. COEFFICIENTS
05110           COMMON /ONE/ TITLE(18),VALUE(20,20),ANAME(20),NUMBER(20),WTFRC(20)
05120          1,EXRINT(20),WTFRCN(20)
05130           COMMON /TWO/ WGHT(100),ALIST(100),LIST(100),ISAMP,ICOMP
05140           COMMON /THREE/ ENERG1(92),ENERG2(92),ENERG3(92),ENERG4(92),ENERG5(
05150          192),ENERG6(92),EDGE1(92),EDGE2(92),EDGE3(92),EDGE4(92),EDGE5(92),R
05160          2ATIO1(92),RATIO2(92),RATIO3(92),RATIO4(92),RATIO5(92),NLINE(7),EDG
05170          3E(20),ENERG7(92)
05180           COMMON /FOUR/ CATION(20),ANION(20),AMOWT(20),ATWTCA(20),ATWTAN(20)
05190          1,DIV(20),FNOCAT(20),FNOANI(20),BMAG(20),ATWTEL(25),ELEM(25),AA(20)
05200          2,BB(20),NOEL(25),ADIV(20),AMAG(30),QUANT,IOUT(10),NOCAT(20),NOANI(
05210          320),NOCOMP,NAN,NCAT,INCODE,IO,KSQ,ISAVE(10)
05220           COMMON /FIVE/ STDINT(20),TINTO(20,20),TIME(20,20),FONINT(20),FACTO
05230          1R(3,160),LINE(20),KTUBE(20),ILINE(20),AKV(20),AMUPE(20,20),AMUEE(6
05240          2,20,20)
05250           DATA ALIST/' H ','HE ','LI ','BE ',' B ',' C ',' N ',' O '
05260          1,' F ','NE ','NA ','MG ','AL ','SI ',' P ',' S ','CL ','A
05270          2R ',' K ','CA ','SC ','TI ',' V ','CR ','MN ','FE ','CO
05280          3','NI ','CU ','ZN ','GA ','GE ','AS ','SE ','BR ','KR ','
05290          4RB ','SR ',' Y ','ZR ','NB ','MO ','TC ','RU ','RH ','PD
05300          5 ','AG ','CD ','IN ','SN ','SB ','TE ',' I ','XE ','CS ',
05310          6'BA ','LA ','CE ','PR ','ND ','PM ','SM ','EU ','GD ','TB
05320          7 ','DY ','HO ','ER ','TM ','YB ','LU ','HF ','TA ',' W '
05330          8,'RE ','OS ','IR ','PT ','AU ','HG ','TL ','PB ','BI ','P
05340          90 ','AT ','RN ','FR ','RA ','AC ','TH ','PA ',' U '/
05350           DATA LIST/' H ','HE ','LI ','BE ',' B ',' C ',' N ',' O ',
05360          1' F ','NE ','NA ','MG ','AL ','SI ',' P ',' S ','CL ','AR
05370          2 ',' K ','CA ','SC ','TI ',' V ','CR ','MN ','FE ','CO '
05380          3,'NI ','CU ','ZN ','GA ','GE ','AS ','SE ','BR ','KR ','R
05390          4B ','SR ',' Y ','ZR ','NB ','MO ','TC ','RU ','RH ','PD
05400          5','AG ','CD ','IN ','SN ','SB ','TE ',' I ','XE ','CS ','
```

```
05410            6 8A  ',','LA ','CE ','PR ','ND ','PM ','SM ','EU ','GD ','TB
05420            7 ','DY ','HO ','ER ','TM ','YB ','LU ','HF ','TA ',' W ',
05430            8'RE ','OS ','IR ','PT ','AU ','HG ','TL ','PB ','BI ','PO
05440            9 ','AT ','RN ','FR ','RA ','AC ','TH ','PA ',' U '/
05450      C     ATOMIC WEIGHTS OF THE ELEMENTS
05460            DATA WGHT/1.00797,4.0026,6.939,9.0122,10.811,12.0111,14.0067,15.99
05470           194,18.9984,20.183,22.9898,24.312,26.9815,28.086,30.9738,32.064,35.
05480           2453,39.948,39.102,40.08,44.956,47.90,50.942,51.996,54.938,55.847,5
05490           38.933,58.71,63.54,65.37,69.72,72.59,74.922,78.96,79.909,83.80,85.4
05500           47,87.62,88.905,91.22,92.906,95.94,99.,101.07,102.905,106.4,107.870
05510           5,112.40,114.82,118.69,121.75,127.60,126.904,131.30,132.905,137.34,
05520           6138.92,140.13,140.92,144.27,145.00,150.35,152.00,157.26,158.93,162
05530           7.51,164.94,167.27,168.94,173.04,174.99,178.58,180.95,183.86,186.22
05540           8,190.20,192.20,195.23,197.00,200.61,204.39,207.21,209.00,210.00,21
05550           91.00,222.00,223.00,226.05,227.00,232.15,231.00,238.07/
05560      C     ENERGY OF KA1 LINES IN KEV
05570            DATA ENERG1/0.0,0.0,0.0,0.0,0.18,0.28,0.39,0.52,0.68,0.85,1.04,1.2
05580           15,1.49,1.74,2.01,2.31,2.62,2.96,3.31,3.69,4.09,4.51,4.95,5.41,5.89
05590           2,6.40,6.92,7.47,8.04,8.63,9.24,9.87,10.53,11.21,11.91,12.63,13.37,
05600           314.14,14.93,15.75,16.58,17.44,18.33,19.23,20.16,21.02,22.10,23.11,
05610           424.14,25.20,26.27,27.38,28.51,29.70,30.85,32.07,33.30,34.57,35.86,
05620           536.45,38.48,40.13,41.31,42.75,43.73,45.99,47.24,48.80,50.41,52.02,
05630           653.69,55.40,57.11,58.85,60.64,62.48,64.33,66.26,68.20,70.15,72.18,
05640           774.21,76.32,78.46,80.65,82.86,85.08,87.42,89.76,92.20,94.41,97.10/
05650      C     ENERGY OF KB1 LINES IN KEV
05660            DATA ENERG2/0.0,0.0,0.0,0.0,0.0,0.0,0.0,0.0,0.0,0.0,0.86,1.07,1.30,1.5
05670           15,1.83,2.14,2.46,2.82,3.19,3.59,4.01,4.46,4.93,5.43,5.95,6.49,7.06
05680           2,7.65,8.26,8.90,9.57,10.26,10.98,11.72,12.49,13.28,14.10,14.96,15.
05690           383,16.74,17.67,18.62,19.61,20.01,21.65,22.70,23.81,24.94,26.09,27.
05700           427,28.47,29.72,30.99,32.29,33.64,34.99,36.37,37.80,39.25,40.75,42.
05710           527,43.82,45.40,47.02,48.72,50.39,52.18,53.87,55.68,57.57,59.39,61.
05720           633,63.38,65.21,67.23,69.31,71.38,73.55,75.76,77.95,80.23,82.58,84.
05730           791,87.30,89.76,92.30,94.84,97.45,0.0,0.0,0.0,0.0,0.0,0.0,0.0,0.0/
05740      C     ENERGY OF LA1 LINES IN KEV
05750            DATA ENERG3/0.0,0.0,0.0,0.0,0.0,0.0,0.0,0.0,0.0,0.0,0.0,0.0,0.0,0.0,0.0,0.0,0.0,0.0,0.0,0.0,0.0,0.0,0.0,0.0,0.
05760           10,0.0,0.0,0.0,0.0,0.0,0.0,0.0,0.0,0.0,0.34,0.39,0.45,0.51,0.57,0.64,0.70,0.77,0.85
05770           2,0.93,1.01,1.10,1.19,1.28,1.38,1.48,1.58,1.69,1.81,1.92,2.04,2.17,
05780           32.29,2.42,2.56,2.70,2.84,2.98,3.13,3.29,3.44,3.60,3.77,3.94,4.11,4
05790           4.29,4.47,4.65,4.84,5.03,5.23,5.43,5.64,5.85,6.06,6.27,6.49,6.72,6.
05800           595,7.18,7.41,7.65,7.90,8.15,8.40,8.65,8.91,9.17,9.44,9.71,9.99,10.
05810           624,10.55,10.84,11.13,11.42,11.73,12.03,12.34,12.65,12.97,13.29,13.
05820           761/
05830      C     ENERGY OF LB1 LINES IN KEV
05840            DATA ENERG4/0.0,0.0,0.0,0.0,0.0,0.0,0.0,0.0,0.0,0.0,0.0,0.0,0.0,0.0,0.0,0.0,0.0,0.0,0.0,0.0,0.0,0.0,0.0,0.0,0.
05850           10,0.0,0.0,0.0,0.0,0.0,0.0,0.0,0.0,0.0,0.34,0.40,0.46,0.52,0.58,0.65,0.72,0.79,0.87
05860           2,0.95,1.03,1.12,1.22,1.32,1.42,1.53,1.64,1.75,1.87,2.00,2.12,2.26,
05870           32.39,2.54,2.68,2.83,2.99,3.15,3.32,3.49,3.66,3.84,4.03,4.22,4.42,4
05880           4.62,4.83,5.04,5.26,5.49,5.72,5.96,6.21,6.46,6.71,6.98,7.25,7.53,7.
05890           581,8.10,8.40,8.71,9.02,9.34,9.67,10.01,10.35,10.71,11.07,11.44,11.
05900           682,12.21,12.62,13.02,13.44,13.87,14.31,14.76,15.23,15.71,16.20,16.
05910           770,17.22/
05920      C     ENERGY OF LB 2 LINES IN KEV
05930            DATA ENERG5/39*0.0,2.22,2.37,2.52,2.67,2.84,3.00,3.17,3.35,3.5,3.7
05940           11,3.90,4.10,4.30,4.51,4.7,4.94,5.16,5.38,5.61,5.85,6.09,6.34,6.59,
05950           26.84,7.10,7.37,7.64,7.91,8.19,8.47,8.76,9.05,9.35,9.65,9.96,10.27,
05960           310.60,10.92,11.25,11.58,11.92,12.27,12.61,12.98,13.34,13.70,14.07,
05970           414.45,14.84,15.23,15.62,16.02,16.43/
05980      C     ENERGY OF MA1 LINES IN KEV
05990            DATA ENERG6/0.0,0.0,0.0,0.0,0.0,0.0,0.0,0.0,0.0,0.0,0.0,0.0,0.0,0.0,0.0,0.0,0.0,0.0,0.0,0.0,0.0,0.0,0.0,0.0,0.
06000           10,0.0,0.0,0.0,0.0,0.0,0.0,0.0,0.0,0.0,0.0,0.0,0.0,0.0,0.0,0.0,0.0,0.0,0.0,0.0,0.0,0.0,0.0,0.0,0.0,0.0,
```

```
06010        20,0,0,0,0,0,0,0,0,0,0,0,0,0,0,0,0,0,0,0,0,0,0,0,0,0,0,0,0,0,0,0,
06020        30,0,0,0,0,0,0,0,0,0,0,0,0,0,0,0,0,0,0,0,0,83,0,88,0,93,0,98,0,0,1,08
06030        4,1,13,1,19,1,25,1,30,1,35,1,41,0,0,1,52,1,58,1,64,1,71,1,78,1,84,1
06040        5,91,1,98,2,05,2,12,2,19,2,27,2,35,2,42,0,0,0,0,0,0,0,0,0,0,0,3,0
06050        60,0,0,3,17/
06060     C     ENERGY OF MB1 LINES IN KEV
06070           DATA ENERG7/0,0,0,0,0,0,0,0,0,0,0,0,0,0,0,0,0,0,0,0,0,0,0,0,0,0,0,0,0,0,
06080        10,0,0,0,0,0,0,0,0,0,0,0,0,0,0,0,0,0,0,0,0,0,0,0,0,0,0,0,0,0,0,0,
06090        20,0,0,0,0,0,0,0,0,0,0,0,0,0,0,0,0,0,0,0,0,0,0,0,0,0,0,0,0,0,0,0,
06100        30,0,0,0,0,0,0,0,0,0,0,0,0,0,0,0,0,0,0,85,0,90,0,95,1,00,0,0,1,10
06110        4,1,15,1,21,1,27,1,32,1,38,1,44,0,0,1,57,1,63,1,70,1,77,1,83,1,91,1
06120        5,98,2,05,2,13,2,20,2,27,2,36,2,44,2,53,0,0,0,0,0,0,0,0,0,0,0,3,1
06130        64,0,0,3,34/
06140     C     K ABSORPTION EDGE IN EV
06150           DATA EDGE1/14,,25,,55,,111,,188,,284,,399,,532,,686,,867,,1072,,13
06160        105,,1560,,1839,,2149,,2472,,2823,,3203,,3608,,4038,,4493,,4965,,54
06170        265,,5989,,6539,,7114,,7709,,8333,,8979,,9659,,10367,,11104,,11867,
06180        3,12658,,13474,,14326,,15200,,16105,,17039,,17998,,18986,,20000,,21
06190        4044,,22117,,23220,,24350,,25514,,26711,,27940,,29200,,30491,,31814
06200        5,,33170,,34561,,35985,,37441,,38925,,40444,,41991,,43569,,45185,,4
06210        66835,,48519,,50239,,51996,,53788,,55618,,57486,,59390,,61332,,6331
06220        74,,65351,,67417,,69525,,71677,,73871,,76111,,78395,,80725,,83103,,
06230        885531,,88095,,90526,,93105,,95730,,98404,,101137,,103922,,106755,,
06240        9109651,,0,0,0,0/
06250     C     L 2 ABSORPTION EDGE IN EV
06260           DATA EDGE2/0,,0,,0,,0,,5,,7,,9,,7,,9,,18,,31,,52,,74,,100,,136,,16
06270        15,,202,,247,,297,,350,,407,,461,,520,,584,,652,,723,,794,,872,,951
06280        2,,1044,,1143,,1249,,1359,,1476,,1596,,1727,,1864,,2007,,2155,,2307
06290        3,,2465,,2625,,2793,,2967,,3146,,3331,,3524,,3727,,3938,,4156,,4381
06300        4,,4612,,4852,,5104,,5360,,5624,,5891,,6165,,6441,,6722,,7013,,7312
06310        5,,7618,,7931,,8252,,8581,,8919,,9265,,9618,,9978,,10349,,10739,,11
06320        6136,,11542,,11957,,12385,,12824,,13273,,13733,,14209,,14698,,15200
06330        7,,15709,,16244,,16785,,17337,,17906,,18484,,19083,,19693,,0,,0,/
06340     C     L 3 ABSORPTION EDGE IN EV
06350           DATA EDGE3/0,,0,,0,,0,,5,,7,,9,,7,,9,,18,,31,,52,,73,,99,,135,,164
06360        1,,200,,245,,294,,347,,402,,455,,513,,575,,641,,710,,779,,855,,931,
06370        2,1021,,1116,,1217,,1323,,1436,,1550,,1675,,1805,,1940,,2080,,2223,
06380        3,2371,,2520,,2677,,2838,,3004,,3173,,3351,,3538,,3730,,3929,,4132,
06390        4,4341,,4557,,4782,,5012,,5247,,5483,,5724,,5965,,6208,,6460,,6717,
06400        5,6977,,7243,,7515,,7790,,8071,,8358,,8648,,8943,,9244,,9561,,9881,
06410        6,10205,,10535,,10871,,11215,,11564,,11918,,12284,,12657,,13035,,13
06420        7418,,13814,,14214,,14619,,15031,,15444,,15871,,16300,,0,,0,/
06430     C     M 4 ABSORPTION EDGE IN EV
06440           DATA EDGE4/0,,0,,0,,0,,0,,0,,0,,0,,0,,0,,0,,0,,0,,0,,0,,0,,0,,0,,0
06450        1,,5,,7,,3,,2,,2,,4,,6,,3,,4,,2,,9,,18,,29,,41,,57,,70,,89,,112,,13
06460        25,,160,,183,,208,,230,,257,,284,,312,,340,,373,,411,,451,,494,,537
06470        3,,582,,631,,685,,740,,796,,849,,902,,951,,1000,,1052,,1107,,1161,,
06480        41218,,1276,,1332,,1391,,1453,,1515,,1576,,1640,,1716,,1793,,1872,,
06490        51949,,2031,,2116,,2202,,2291,,2385,,2485,,2586,,2688,,2798,,2909,,
06500        63022,,3136,,3248,,3370,,3491,,0,,0,/
06510     C     M 5 ABSORPTION EDGE IN EV
06520           DATA EDGE5/0,,0,,0,,0,,0,,0,,0,,0,,0,,0,,0,,0,,0,,0,,0,,0,,0,,0,,0
06530        1,,5,,7,,3,,2,,2,,4,,6,,3,,4,,2,,9,,18,,29,,41,,57,,69,,89,,111,,13
06540        23,,158,,180,,205,,227,,253,,279,,307,,335,,367,,404,,443,,485,,528
06550        3,,572,,620,,672,,726,,781,,832,,884,,931,,978,,1027,,1081,,1131,,1
06560        4186,,1242,,1295,,1351,,1409,,1468,,1527,,1589,,1662,,1735,,1810,,1
06570        5883,,1960,,2041,,2121,,2206,,2295,,2390,,2484,,2580,,2683,,2787,,2
06580        6892,,3000,,3105,,3219,,3332,,0,,0,/
06590           DATA NLINE/'KA1','KB1','LA1','LB1','LB2','MA1','MB1'/
06600     C     FRACTION OF KB1 LINE IN K-SERIES
```

D-4996

```
06610          DATA RATIO1/13*0.01,0.0266,0.0432,0.0598,0.0764,0.0930,0.1096,0.12
06620         1162,0.1428,71*0.16/
06630    C    FRACTION IF LA LINE IN L3-SERIES
06640          DATA RATIO2/36*1.0,5*0.99,0.98,0.95,0.91,0.88,0.84,0.80,0.75,2*0.8
06650         15,0.83,0.80,2*0.79,2*0.72,0.77,0.76,0.75,0.77,0.78,0.79,0.78,0.81,
06660         22*0.78,0.77,0.76,0.77,0.76,0.77,0.79,14*0.78,6*0.73/
06670    C    FRACTION IF LB1 IN L2-SERIES
06680          DATA RATIO3/36*1.0,6*0.99,0.97,0.95,0.93,0.91,0.89,2*0.91,0.89,0.9
06690         11,0.87,0.84,0.82,0.81,0.85,5*0.88,0.89,0.90,0.92,0.90,0.88,0.90,0.
06700         289,0.90,0.89,0.90,0.92,0.89,0.92,5*0.91,0.92,0.91,0.93,4*0.91,3*0.
06710         386,0.88,2*0.86/
06720    C    FRACTION OF LB2 LINE IN L3-SERIES
06730          DATA RATIO4/36*0.0,5*0.01,0.02,0.05,0.09,0.12,0.16,0.20,0.25,2*0.1
06740         15,0.17,0.20,2*0.21,2*0.28,0.23,0.24,0.25,0.23,0.22,0.21,0.22,0.19,
06750         22*0.22,0.23,0.24,0.23,0.24,0.23,0.21,14*0.22,6*0.27/
06760    C    FRACTION OF MB LINE IN M-SERIES DATA MISSING RATIO5
06770    C    .20 SUBSTITUTED UNTIL EXPERIMENTAL VALUES CAN BE OBTAINED
06780          DATA RATIO5/92*.20/
06790          END
06800          SUBROUTINE CONC (KOUNT,J)
06810    C
06820    C    GETS INITIAL ESTIMATES OF CONCENTRATION BY LINEAR EXTRAPOLATION
06830    C    OF INTENSITIES
06840    C    NORMALIZES WEIGHT FRACTIONS TO 1.0  AFTER EACH ITERATION
06850    C
06860          DIMENSION KFLAG(20)
06870          COMMON /ONE/ TITLE(18),VALUE(20,20),ANAME(20),NUMBER(20),WTFRC(20)
06880         1,EXRINT(20),WTFRCN(20)
06890          COMMON /TWO/ WGHT(100),ALIST(100),LIST(100),ISAMP,ICOMP
06900          COMMON /FIVE/ STDINT(20),TINTO(20,20),TIME(20,20),FONINT(20),FACTO
06910         1R(3,160),LINE(20),KTUBE(20),ILINE(20),AKV(20),AMUPE(20,20),AMUEE(6
06920         2,20,20)
06930    C
06940    C    SUMA= SUM OF PREVIOUSLY DETERMINED ELEMENTS <<<< NOT CHANGED
06950    C    SUME = SUM OF ELEMENTS DETERMINED BY X-RAY
06960    C    SUM OF ALL WEIGHT FRACTIONS NORMALIZED TO 1.0
06970    C
06980          KEY=0
06990          IFLAG=0
07000          SUME=0.0
07010          SUMA=0.0
07020          IF (KOUNT.NE.0) GO TO 2
07030          DO 1 I=1,ICOMP
07040          KFLAG(I)=0
07050          WTFRC(I)=0.0
07060    1     CONTINUE
07070    2     DO 7 I=1,ICOMP
07080          IF (TIME(I,J).EQ.0.0) GO TO 4
07090          IF (KOUNT.NE.0) GO TO 3
07100          WTFRC(I)=TINTO(I,J)*VALUE(I,I)
07110    3     SUME=SUME+WTFRC(I)
07120          GO TO 7
07130    4     IF (TINTO(I,J).EQ.0.0) GO TO 6
07140          IF (KOUNT.NE.0) GO TO 5
07150          WTFRC(I)=TINTO(I,J)/100.
07160    5     SUMA=SUMA+WTFRC(I)
07170    C
07180    C    KFLAG NE. 0 MEANS ELEMENT WAS DETERMINED INDEPENDENTLY
07190    C
07200          KFLAG(I)=1
```

```
07210            GO TO 7
07220   C
07230   C     ELEMENT IS TO BE DETERMINED BY DIFFERENCE
07240   C
07250   6     KEY=1
07260         IFLAG=I
07270   7     CONTINUE
07280         IF (KEY.EQ.1) GO TO 9
07290         FACT=(1.0-SUMA)/SUME
07300         DO 8 I=1,ICOMP
07310         IF (KFLAG(I).EQ.1) GO TO 8
07320         WTFRC(I)=WTFRC(I)*FACT
07330   8     CONTINUE
07340         GO TO 10
07350   9     WTFRC(IFLAG)=1.0-SUME-SUMA
07360   10    RETURN
07370         END
07380         SUBROUTINE DTIME
07390   C     DUMMY SUBROUTINE TO BE REPLACED BY USER IF DEADTIME CORRECTIONS
07400   C     ARE NECESSARY
07410         COMMON /FIVE/ STDINT(20),TINTO(20,20),TIME(20,20),FONINT(20),FACTO
07420        1R(3,160),LINE(20),KTUBE(20),ILINE(20),AKV(20),AMUPE(20,20),AMUEE(6
07430        2,20,20)
07440   C
07450   C
07460         RETURN
07470         END
07480         SUBROUTINE TERMS (MARK,NINT,JLINE,NAT)
07490   C     CALLED BY MAIN AND FLUCOR
07500         DIMENSION JLINE(140), NAT(140)
07510         COMMON /ONE/ TITLE(18),VALUE(20,20),ANAME(20),NUMBER(20),WTFRC(20)
07520        1,EXRINT(20),WTFRCN(20)
07530         COMMON /TWO/ WGHT(100),ALIST(100),LIST(100),ISAMP,ICOMP
07540         COMMON /THREE/ ENERG1(92),ENERG2(92),ENERG3(92),ENERG4(92),ENERG5(
07550        192),ENERG6(92),EDGE1(92),EDGE2(92),EDGE3(92),EDGE4(92),EDGE5(92),R
07560        2ATIO1(92),RATIO2(92),RATIO3(92),RATIO4(92),RATIO5(92),NLINE(7),EDG
07570        3E(20),ENERG7(92)
07580         COMMON /FIVE/ STDINT(20),TINTO(20,20),TIME(20,20),FONINT(20),FACTO
07590        1R(3,160),LINE(20),KTUBE(20),ILINE(20),AKV(20),AMUPE(20,20),AMUEE(6
07600        2,20,20)
07610         GO TO (1,2), MARK
07620   1     KK=ICOMP
07630         JJ=1
07640         GO TO 3
07650   2     KK=NINT+ICOMP
07660         JJ=ICOMP+1
07670   3     DO 25 I=JJ,KK
07680         GO TO (4,5), MARK
07690   4     Z=NUMBER(I)
07700         K=LINE(I)
07710         NMBR=NUMBER(I)
07720         GO TO 6
07730   5     IZ=NAT(I-ICOMP)
07740         Z=NUMBER(IZ)
07750         NMBR=NUMBER(IZ)
07760         K=JLINE(I-ICOMP)
07770   6     GO TO (7,8,9,10,11,12,13), K
07780   C
07790   C     FACTOR(3,I) IS THE RATIO OF THE INTENSITY OF THE ANALYZED LINE
07800   C     TO THE TOTAL INTENSITY IN THE EMISSION SERIES
```

```
07810   C       VALUES OBTAINED BY EXPERIMENTS OF STEPHENSON
07820   C       RATIO5 FOR M-SERIES IS MISSING
07830   C
07840   7       FACTOR(3,I)=1.-RATIO1(NMBR)
07850           GO TO 14
07860   8       FACTOR(3,I)=RATIO1(NMBR)
07870           GO TO 14
07880   9       FACTOR(3,I)=RATIO2(NMBR)
07890           GO TO 19
07900   10      FACTOR(3,I)=RATIO3(NMBR)
07910           GO TO 19
07920   11      FACTOR(3,I)=RATIO4(NMBR)
07930           GO TO 19
07940   12      FACTOR(3,I)=1.-RATIO5(NMBR)
07950           GO TO 24
07960   13      FACTOR(3,I)=RATIO5(NMBR)
07970           GO TO 24
07980   14      IF (NMBR.LE.10) GO TO 15
07990           IF (NMBR.LE.18) GO TO 16
08000   C       FACTOR(2,I) IS THE FLUORSCENT YIELD
08010           FACTOR(2,I)=1./(1.+1.0252E+06*(Z-1.1172E-03-4.2E-08*Z*Z*Z)**(-4))
08020           GO TO 18
08030   15      A=9.0E+05
08040           GO TO 17
08050   16      A=1.19E+06
08060   17      FACTOR(2,I)=1./(1.+A/(Z*Z*Z*Z))
08070   C
08080   C       FACTOR(1,I) IS THE JUMP RATIO  VALUES DERIVED FROM HEINREICH
08090   C
08100   18      FACTOR(1,I)=52.57+0.4771*Z-17.49*ALOG(Z)
08110           GO TO 25
08120   19      IF (NMBR.LE.68) GO TO 20
08130           FACTOR(2,I)=-0.5488+0.0115*Z
08140           GO TO 21
08150   20      FACTOR(2,I)=-0.1854+0.006*Z
08160   21      LD=K-2
08170           GO TO (22,23,22), LD
08180   22      FACTOR(1,I)=5.8948-0.044*Z
08190           GO TO 25
08200   23      FACTOR(1,I)=1.63
08210           GO TO 25
08220   C
08230   C       M-SERIES JUMP RATIOS AND FLUOR. YIELDS ARE POORLY KNOWN
08240   C
08250   24      FACTOR(2,I)=1.17
08260           FACTOR(1,I)=0.01
08270   25      FACTOR(1,I)=(FACTOR(1,I)-1.)/FACTOR(1,I)
08280           RETURN
08290           END
08300           SUBROUTINE ASSIGN
08310   C
08320   C       ASSIGNS LINE TYPES, DETERMINES THE PRIMARY RADIATION USED FOR
08330   C       EXCITATION OF EACH ELEMENT IN THE SAMPLE
08340   C
08350           COMMON /ONE/ TITLE(16),VALUE(20,20),ANAME(20),NUMBER(20),WTFRC(20)
08360          1,EXRINT(20),WTFRCN(20)
08370           COMMON /TWO/ WGHT(100),ALIST(100),LIST(100),ISAMP,ICOMP
08380           COMMON /THREE/ ENERG1(92),ENERG2(92),ENERG3(92),ENERG4(92),ENERG5(
08390          192),ENERG6(92),EDGE1(92),EDGE2(92),EDGE3(92),EDGE4(92),EDGE5(92),R
08400          2ATIO1(92),RATIO2(92),RATIO3(92),RATIO4(92),RATIO5(92),NLINE(7),EDG
```

```
08410            3E(20),ENERG7(92)
08420            COMMON /FIVE/ STDINT(20),TINTO(20,20),TIME(20,20),FONINT(20),FACTO
08430           1R(3,160),LINE(20),KTUBE(20),ILINE(20),AKV(20),AMUPE(20,20),AMUEE(6
08440           2,20,20)
08450            DO 13 I=1,ICOMP
08460            DO 1 J=1,7
08470            IF (LINE(I).EQ.NLINE(J)) GO TO 2
08480      1     CONTINUE
08490            WRITE (6,14) ANAME(I),LINE(I)
08500            CALL EXIT
08510      2     LINE(I)=J
08520            M=NUMBER(I)
08530            GO TO (3,3,4,5,4,6,7), J
08540      3     EDGE(I)=EDGE1(M)
08550            GO TO 8
08560      4     EDGE(I)=EDGE3(M)
08570            GO TO 8
08580      5     EDGE(I)=EDGE2(M)
08590            GO TO 8
08600      6     EDGE(I)=EDGE5(M)
08610            GO TO 8
08620      7     EDGE(I)=EDGE4(M)
08630      C
08640      C     EDGES ARE IN EV, ENERGIES ARE IN KEV
08650      C
08660      8     EDGE(I)=EDGE(I)/1000.
08670            IF (EDGE(I).GT.AKV(I)) GO TO 11
08680            DO 9 K=1,92
08690            IF (ENERG1(K).GT.EDGE(I)) GO TO 10
08700      9     CONTINUE
08710            II=NUMBER(I)
08720            WRITE (6,15) ALIST(II),NLINE(J)
08730            CALL EXIT
08740      10    KTUBE(I)=K
08750            ILINE(I)=1
08760            GO TO 12
08770      11    II=NUMBER(I)
08780            WRITE (6,16) ALIST(II),NLINE(J)
08790            CALL EXIT
08800      12    KK=KTUBE(I)
08810            II=NUMBER(I)
08820            WRITE (6,17) ALIST(KK),NLINE(1),ALIST(II),NLINE(J)
08830      13    CONTINUE
08840            RETURN
08850      C
08860      C
08870      14    FORMAT ('X','LINE ANALYZED',2X,2A3,2X,'NOT FOUND-SUB. AGGIGN',/)
08880      15    FORMAT ('X','NO ENERGY GREATER THAN THE ABS. EDGE OF'2X,2A3,/)
08890      16    FORMAT ('X','THE EDGE OF THE LINE ANALYSED HAS MORE ENERGY THAN TH
08900           1ETUBE VOLTAGE--',2X,2A3,/)
08910      17    FORMAT ('X',2A3,2X,'IS USED TO EXCITE',2X,2A3,/)
08920            END
08930            SUBROUTINE MASABS
08940      C
08950      C     LOOKS UP MASS ABSORPTION COEFFICIENTS OF ALL NEEDED ELEMENTS
08960      C     FILE 10= KA1, FILE11= KB1, FILE12= LA1, FILE13= KB1,2, FILE 14= MA
08970      C     FILE 15= MB   THEISEN'S TABLES
08980      C
08990            COMMON /ONE/ TITLE(18),VALUE(20,20),ANAME(20),NUMBER(20),WTFRC(20)
09000           1,EXRINT(20),WTFRCN(20)
```

```
D-4996
09010         COMMON /TWO/ WGHT(100),ALIST(100),LIST(100),ISAMP,ICOMP
09020         COMMON /THREE/ ENERG1(92),ENERG2(92),ENERG3(92),ENERG4(92),ENERG5(
09030        192),ENERG6(92),EDGE1(92),EDGE2(92),EDGE3(92),EDGE4(92),EDGE5(92),R
09040        2ATIO1(92),RATIO2(92),RATIO3(92),RATIO4(92),RATIO5(92),NLINE(7),EDG
09050        3E(20),ENERG7(92)
09060         COMMON /FIVE/ STDINT(20),TINTO(20,20),TIME(20,20),FONINT(20),FACTO
09070        1R(3,160),LINE(20),KTUBE(20),ILINE(20),AKV(20),AMUPE(20,20),AMUEE(6
09080        2,20,20)
09090         DIMENSION GUNK(92)
09100   C****************************************************************
09110   C     STATEMENTS FOR IBM/360 MACHINES WITH DISK FILE
09120   C     DELETE FOLLOWING STATEMENT AND REPLECE WITH DEFINE FILES
09130         IADDR=LRECSZ(92)
09140   C     DEFINE FILE 10(92,368,L,I1)
09150   C     DEFINE FILE 11(92,368,L,I1)
09160   C     DEFINE FILE 12(92,368,L,I1)
09170   C     DEFINE FILE 13(92,368,L,I1)
09180   C     DEFINE FILE 14(92,368,L,I1)
09190   C     DEFINE FILE 15(92,368,L,I1)
09200   C
09210   C     REPLECE THE TWO READ STATEMENTS WITH THE FOLLOWING TWO CARDS
09220   C     READ (N'I1) (GUNK(K),K=1,92)
09230   C     READ (N'I1) (GUNK(K),K=1,92)
09240   C     DELETE SETADR CARDS
09250   C****************************************************************
09260   C     GET ABS. COEFF OF EACH ELEMENT IN SAMPLE FOR ALL LINES OF
09270   C     ALL ELEMENTS IN THE SAMPLE   (KA,KB,LA1,LB1,2,MA,MB
09280   C
09290         DO 1 N=10,15
09300         N1=N-9
09310         DO 1 I=1,ICOMP
09320         I1=NUMBER(I)
09330         CALL SETADR(N,(I1-1)*IADDR)
09340         READ(N) (GUNK(K),K=1,92)
09350         DO 1 J=1,ICOMP
09360         I2=NUMBER(J)
09370         IF (GUNK(I2).EQ.0.) CALL HELP(GUNK,I2)
09380         AMUEE(N1,I,J)=GUNK(I2)
09390   1     CONTINUE
09400   C
09410   C     GET ABS. COEFF. OF ALL ELEMENTS IN THE SAMPLE FOR THE PRIMARY RADI
09420   C
09430         DO 2 I=1,ICOMP
09440         I1=KTUBE(I)
09450         N=ILINE(I)+9
09460         CALL SETADR(N,(I1-1)*IADDR)
09470         READ(N) (GUNK(K),K=1,92)
09480         DO 2 K=1,ICOMP
09490         NN=NUMBER(K)
09500         IF (GUNK(NN).EQ.0.) CALL HELP(GUNK,NN)
09510         AMUPE(I,K)=GUNK(NN)
09520   2     CONTINUE
09530   C
09540   C     THESE STATEMENTS MAY BE DELETED TO SHORTEN OUTPUT
09550   C     ****************************************************************
09560         WRITE (6,5)
09570         DO 3 I=1,ICOMP
09580         II=NUMBER(I)
09590         KK=LINE(I)
09600         WRITE (6,6) ALIST(II)
```

```
09610           WRITE (6,7) NLINE(1),NLINE(2),NLINE(3),NLINE(4),NLINE(6),NLINE(7)
09620           DO 3 J=1,ICOMP
09630           JJ=NUMBER(J)
09640           WRITE (6,8) ALIST(JJ),(AMUEE(N1,I,J),N1=1,6)
09650     3     CONTINUE
09660           WRITE (6,9)
09670           DO 4 I=1,ICOMP
09680           II=KTUBE(I)
09690           WRITE (6,10) ALIST(II),NLINE(1)
09700           DO 4 J=1,ICOMP
09710           JJ=NUMBER(J)
09720           WRITE (6,11) ALIST(JJ),AMUPE(I,J)
09730     4     CONTINUE
09740     C     *****************************************************************
09750           RETURN
09760     C
09770     C
09780     5     FORMAT ('X','MASS ABSORPTION COEFFICIENTS FROM TABLE LOOKUP',///)
09790     6     FORMAT ('X','ABSORPTION COEFFICIENTS FOR',2X,A3,/)
09800     7     FORMAT ('X',7X,6(4X,A3,6X))
09810     8     FORMAT ('X',A3,4X,6(F10.4,3X))
09820     9     FORMAT ('X','ABSORPTION COEFFICIENTS OF ELEMENTS IN THE SAMPLE FOR
09830          1 THE PRIMARY RADIATIONS',/)
09840     10    FORMAT ('X','ABSORPTION COEFFICIENTS FOR',2X,2A3)
09850     11    FORMAT ('X',A3,2X,F10.4)
09860           END
09870           SUBROUTINE CAC (INOUT,KOUNT)
09880     C     FORTRAN 4 PROGRAM FOR THE CONVERSION OF REPRESENTATIONS
09890     C     OF CHEMICAL COMPOSITION
09900     C     WRITTEN BY D.A. STEPHENSON ..... UPDATED AND RESEQUENCED 11/20/67
09910     C     MODIFIED FOR THEORY 1/22/70
09920     C     FOR STANDARDS IT RETURNS WEIGHT FRACTION ELEMENTS TO MAIN PROGRAM
09930     C     FOR SAMPLES IT CONVERTS WEIGHT FRACTION ELEMENTS TO ANY OR ALL
09940     C     REPRESENTATIONS OF CHEMICAL COMPOSITION
09950           DIMENSION AAA(9)
09960           COMMON /ONE/ TITLE(18),VALUE(20,20),ANAME(20),NUMBER(20),WTFRC(20)
09970          1,EXRINT(20),WTFRCN(20)
09980           COMMON /TWO/ WGHT(100),ALIST(100),LIST(100),ISAMP,ICOMP
09990           COMMON /FOUR/ CATION(20),ANION(20),AMOWT(20),ATWTCA(20),ATWTAN(20)
10000          1,DIV(20),FNOCAT(20),FNOANI(20),BMAG(20),ATWTEL(25),ELEM(25),AA(20)
10010          2,BB(20),NOEL(25),ADIV(20),AMAG(30),QUANT,IOUT(10),NOCAT(20),NOANI(
10020          320),NOCOMP,NAN,NCAT,INCODE,IO,KSO,ISAVE(10)
10030           DATA AAA/' ','2','3','4','5','6','7','8','9'/
10040           NT=5
10050           IO=6
10060           IF (KOUNT.NE.0) GO TO 1
10070           ISAMP=0
10080           WRITE (IO,36)
10090     C***************************************************************
10100     C     STATEMENTS FOR MACHINES REQUIREING A4
10110     C     READ(NT,27,END=26) (TITLE(I),I=1,18)
10120     C  27 FORMAT (18A4)
10130     C     WRITE (IO,28) (TITLE(I),I=1,18)
10140     C  28 FORMAT ('X',18A4,///)
10150     C***************************************************************
10160           READ(NT,27,END=26) (TITLE(I),I=1,12)
10170           WRITE(IO,28) (TITLE(I),I=1,12)
10180           READ (NT,29) INCODE,NOCOMP,NOSAMP,IFOR,NAN,NCAT,QUANT,IFLAG
10190           WRITE (IO,30) NOCOMP
10200           WRITE (IO,31) NOSAMP
```

```
10210   1      ICOMP=NAN+NCAT
10220          J=NOCOMP
10230          KSQ=0
10240          IF (KOUNT.NE.0) GO TO 9
10250          DO 2 I=1,10
10260          IOUT(I)=0
10270          IF (I.EQ.INOUT) IOUT(I)=1
10280          ISAVE(I)=IOUT(I)
10290   2      CONTINUE
10300          GO TO (3,3,3,3,7,7,7,7,3,7), INCODE
10310   3      DO 6 I=1,NOCOMP
10320          IF (KOUNT.NE.0) GO TO 4
10330          READ (NT,32) CATION(I),NOCAT(I),ANION(I),NOANI(I),DIV(I)
10340   4      FNOCAT(I)=NOCAT(I)
10350          FNOANI(I)=NOANI(I)
10360          ADIV(I)=DIV(I)
10370          IFLOW=1
10380          CALL LKUP(ICANC,IFLOW,I)
10390          IF (ICANC.EQ.1) GO TO 26
10400          AMOWT(I)=((FNOCAT(I)*ATWTCA(I))+(FNOANI(I)*ATWTAN(I)))/DIV(I)
10410          N1=NOCAT(I)
10420          N2=NOANI(I)
10430          AA(I)=AAA(N1)
10440          BB(I)=AAA(N2)
10450          IF (DIV(I).NE.1.0) GO TO 5
10460          GO TO 6
10470   5      WRITE (IO,37) CATION(I),AA(I),ANION(I),BB(I),DIV(I)
10480   6      CONTINUE
10490          IF (KOUNT.NE.0) GO TO 12
10500          GO TO 10
10510   7      DO 8 I=1,ICOMP
10520          READ (NT,35) ELEM(I)
10530          IFLOW=2
10540          CALL LKUP(ICANC,IFLOW,I)
10550          IF (ICANC.EQ.1) GO TO 26
10560   8      CONTINUE
10570   9      J=ICOMP
10580          IF (IFLAG.EQ.1) GO TO 3
10590   10     IF (KOUNT.NE.0) GO TO 12
10600          IF (IFOR.NE.0) GO TO 11
10610          READ (NT,33) (BMAG(I),I=1,J)
10620          GO TO 12
10630   11     READ (NT,34) (BMAG(I),I=1,J)
10640   12     ISAMP=ISAMP+1
10650          DO 13 I=1,10
10660          IOUT(I)=ISAVE(I)
10670   13     CONTINUE
10680          GO TO (14,15,16,17,18,23,19,20,21,22), INCODE
10690   14     CALL WTOX
10700   15     CALL MOLEOX
10710          GO TO 24
10720   16     CALL PPMAOX
10730          GO TO 15
10740   17     CALL PPMWOX
10750          GO TO 14
10760   18     CALL WTELE
10770          GO TO 24
10780   19     CALL PPMAEL
10790          GO TO 24
10800   20     CALL PPMWEL
```

```
10810           GO TO 24
10820    21     CALL GRAMS
10830           GO TO 14
10840    22     CALL GRAMEL
10850           GO TO 18
10860    23     IF (ISAMP.NE.1) GO TO 24
10870           WRITE (IO,38)
10880    24     CALL CALC(KOUNT)
10890           IF (ISAMP-NOSAMP) 10,25,25
10900    25     RETURN
10910    C
10920    26     CALL EXIT
10930    C
10940       27 FORMAT(12A6)
10950       28 FORMAT('X',12A6,///)
10960    29     FORMAT (2(I2),I3,3I2,F7.0,I1)
10970    30     FORMAT (39H THE NUMBER OF COMPOUNDS PER SAMPLE IS ,I3)
10980    31     FORMAT (26H THE NUMBER OF SAMPLES IS ,I3)
10990    32     FORMAT (2(A2,I1),2X,F7.0)
11000    33     FORMAT (10F7.0)
11010    34     FORMAT (10F7.0)
11020    35     FORMAT (A2)
11030    36     FORMAT (1H1)
11040    37     FORMAT (24H THE DIVISION FACTOR OF ,2(A2,A1),3H IS,F7.4,/,' VALUES
11050          1 CORRESPONDING TO THIS REFER TO THE CORRECT COMPOUND ')
11060    38     FORMAT (' DATA ENTERED ARE GIVEN AS ATOMIC PERCENT ELEMENTS')
11070           END
11080           SUBROUTINE LKUP (ICANC,IFLOW,I)
11090    C
11100           COMMON /ONE/ TITLE(18),VALUE(20,20),ANAME(20),NUMBER(20),WTFRC(20)
11110          1,EXRINT(20),WTFRCN(20)
11120           COMMON /TWO/ WGHT(100),ALIST(100),LIST(100),ISAMP,ICOMP
11130           COMMON /FOUR/ CATION(20),ANION(20),AMOWT(20),ATWTCA(20),ATWTAN(20)
11140          1,DIV(20),FNOCAT(20),FNOANI(20),BMAG(20),ATWTEL(25),ELEM(25),AA(20)
11150          2,BB(20),NOEL(25),ADIV(20),AMAG(30),QUANT,IOUT(10),NOCAT(20),NOANI(
11160          320),NOCOMP,NAN,NCAT,INCODE,IO,KSQ,ISAVE(10)
11170           ICANC=0
11180           GO TO (1,6), IFLOW
11190    1      ATWTCA(I)=0.0
11200           ATWTAN(I)=0.0
11210           DO 2 J=1,92
11220           IF (CATION(I).NE.ALIST(J)) GO TO 2
11230           ATWTCA(I)=WGHT(J)
11240           NUMBER(I)=J
11250           GO TO 3
11260    2      CONTINUE
11270    3      DO 4 J=1,92
11280           IF (ANION(I).NE.ALIST(J)) GO TO 4
11290           ATWTAN(I)=WGHT(J)
11300           NUMBER(I)=J
11310           GO TO 5
11320    4      CONTINUE
11330    5      IF (ATWTCA(I).NE.0.0.AND.ATWTAN(I).NE.0.0) GO TO 8
11340           WRITE (IO,9)
11350           WRITE (IO,10) CATION(I),NOCAT(I),ANION(I),NOANI(I)
11360           WRITE (IO,11)
11370           ICANC=1
11380           GO TO 8
11390    6      ATWTEL(I)=0.0
11400           DO 7 J=1,92
```

```
11410          IF (ELEM(I).NE.ALIST(J)) GO TO 7
11420          ATWTEL(I)=WGHT(J)
11430          NOEL(I)=J
11440          NUMBER(I)=J
11450          GO TO 8
11460     7    CONTINUE
11470          WRITE (IO,12)
11480          WRITE (IO,13) ELEM(I)
11490          WRITE (IO,11)
11500          ICANC=1
11510     8    RETURN
11520     C
11530     C
11540     9    FORMAT (' AN ELEMENT IN THE FOLLOWING COMPOUND IS NOT IN THE LOOKU
11550         1P TABLE, PLEASE CHECK ABBREVIATIONS ')
11560    10    FORMAT ('X',2(A2,I1))
11570    11    FORMAT (' THIS JOB IS SKIPPED ')
11580    12    FORMAT (' THE FOLLOWING ELEMENT IS NOT IN THE LOOKUP TABLE, PLEASE
11590         1 CHECK ABBREVIATIONS')
11600    13    FORMAT ('X',A2)
11610          END
11620          SUBROUTINE WTOX
11630     C
11640          COMMON /ONE/ TITLE(18),VALUE(20,20),ANAME(20),NUMBER(20),WTFRC(20)
11650         1,EXRINT(20),WTFRCN(20)
11660          COMMON /TWO/ WGHT(100),ALIST(100),LIST(100),ISAMP,ICOMP
11670          COMMON /FOUR/ CATION(20),ANION(20),AMOWT(20),ATWTCA(20),ATWTAN(20)
11680         1,DIV(20),FNOCAT(20),FNOANI(20),BMAG(20),ATWTEL(25),ELEM(25),AA(20)
11690         2,BB(20),NOEL(25),ADIV(20),AMAG(30),QUANT,IOUT(10),NOCAT(20),NOANI(
11700         320),NOCOMP,NAN,NCAT,INCODE,IO,KSQ,ISAVE(10)
11710          IF (INCODE.NE.9.AND.INCODE.NE.4) GO TO 1
11720          GO TO 2
11730     1    IF (ISAMP.NE.1) GO TO 2
11740          WRITE (IO,8)
11750     2    SUM=0.0
11760          DO 3 I=1,NOCOMP
11770          BMAG(I)=BMAG(I)/AMOWT(I)
11780          SUM=SUM+BMAG(I)
11790     3    CONTINUE
11800          DO 4 I=1,NOCOMP
11810          BMAG(I)=(BMAG(I)/SUM)*100.
11820     4    CONTINUE
11830          IF (IOUT(2).NE.0) GO TO 5
11840          GO TO 7
11850     5    WRITE (IO,9) ISAMP
11860          WRITE (IO,10)
11870          DO 6 I=1,NOCOMP
11880          WRITE (IO,11) CATION(I),AA(I),ANION(I),BB(I),BMAG(I)
11890     6    CONTINUE
11900          IOUT(2)=0
11910     7    RETURN
11920     C
11930     C
11940     8    FORMAT (' DATA ENTERED ARE GIVEN IN WEIGHT PERCENT OF THE COMPONEN
11950         1TS')
11960     9    FORMAT (//////,15H SAMPLE NUMBER ,I3)
11970    10    FORMAT (' MOLE PERCENT OF THE COMPONENTS',/)
11980    11    FORMAT ('X',2(A2,A1),3H = ,F8.4,/)
11990          END
12000          SUBROUTINE MOLEOX
```

```
D-4996
12010   C
12020         DIMENSION CAT(20),ANI(20),PCAT(20),PANI(20),DUMCAT(20),DUMANI(20)
12030         COMMON /ONE/ TITLE(18),VALUE(20,20),ANAME(20),NUMBER(20),WTFRC(20)
12040        1,EXRINT(20),WTFRCN(20)
12050         COMMON /TWO/ WGHT(100),ALIST(100),LIST(100),ISAMP,ICOMP
12060         COMMON /FOUR/ CATION(20),ANION(20),AMOWT(20),ATWTCA(20),ATWTAN(20)
12070        1,DIV(20),FNOCAT(20),FNOANI(20),BMAG(20),ATWTEL(25),ELEM(25),AA(20)
12080        2,BB(20),NOEL(25),ADIV(20),AMAG(30),QUANT,IOUT(10),NOCAT(20),NOANI(
12090        320),NOCOMP,NAN,NCAT,INCODE,IO,KSQ,ISAVE(10)
12100         IF (INCODE.NE.1) GO TO 2
12110         DO 1 I=1,NOCOMP
12120         ADIV(I)=1.0
12130   1     CONTINUE
12140   2     IF (INCODE.NE.9.AND.INCODE.NE.1) GO TO 3
12150         GO TO 5
12160   3     IF (INCODE.NE.3.AND.INCODE.NE.4) GO TO 4
12170         GO TO 5
12180   4     IF (ISAMP.NE.1) GO TO 5
12190         WRITE (IO,22)
12200   5     SUM=0.0
12210         DO 6 I=1,NOCOMP
12220         CAT(I)=FNOCAT(I)*BMAG(I)/ADIV(I)
12230         ANI(I)=FNOANI(I)*BMAG(I)/ADIV(I)
12240         SUM=SUM+CAT(I)+ANI(I)
12250   6     CONTINUE
12260         DO 7 I=1,NOCOMP
12270         PCAT(I)=(CAT(I)/SUM)*100.
12280         PANI(I)=(ANI(I)/SUM)*100.
12290         DUMCAT(I)=CATION(I)
12300         DUMANI(I)=ANION(I)
12310   7     CONTINUE
12320         SUMCAT=0.0
12330         SUMANI=0.0
12340         J=1
12350         K=1
12360         INC=0
12370   8     DO 10 I=1,NOCOMP
12380         IF (CATION(J).EQ.DUMCAT(I)) GO TO 9
12390         GO TO 10
12400   9     SUMCAT=SUMCAT+PCAT(I)
12410         ELEM(K)=CATION(I)
12420         NOEL(K)=I
12430         DUMCAT(I)=0.0
12440         INC=1
12450   10    CONTINUE
12460         IF (INC.NE.1) GO TO 11
12470         IFLOW=2
12480         CALL LKUP(ICANC,IFLOW,K)
12490         BMAG(K)=SUMCAT
12500         IF (J.EQ.NOCOMP) GO TO 12
12510         J=J+1
12520         K=K+1
12530         SUMCAT=0.0
12540         INC=0
12550         GO TO 8
12560   11    IF (J.EQ.NOCOMP) GO TO 12
12570         J=J+1
12580         GO TO 8
12590   12    IF (INC.EQ.0) GO TO 13
12600         K=K+1
```

D-4996

```
12610            INC=0
12620    13      J=1
12630    14      DO 16 I=1,NOCOMP
12640            IF (ANION(J).EQ.DUMANI(I)) GO TO 15
12650            GO TO 16
12660    15      SUMANI=SUMANI+PANI(I)
12670            ELEM(K)=ANION(I)
12680            NOEL(K)=I
12690            DUMANI(I)=0.0
12700            INC=1
12710    16      CONTINUE
12720            IF (INC.NE.1) GO TO 17
12730            IFLOW=2
12740            CALL LKUP(ICANC,IFLOW,K)
12750            BMAG(K)=SUMANI
12760            IF (J.EQ.NOCOMP) GO TO 18
12770            J=J+1
12780            K=K+1
12790            SUMANI=0.0
12800            INC=0
12810            GO TO 14
12820    17      IF (J.EQ.NOCOMP) GO TO 18
12830            J=J+1
12840            GO TO 14
12850    18      IF (IOUT(6).NE.0) GO TO 19
12860            GO TO 21
12870    19      WRITE (IO,23) ISAMP
12880            WRITE (IO,24)
12890            DO 20 J=1,ICOMP
12900            WRITE (IO,25) ELEM(J),BMAG(J)
12910    20      CONTINUE
12920            IOUT(6)=0
12930    21      RETURN
12940    C
12950    C
12960    22      FORMAT (' DATA ENTERED ARE GIVEN IN MOLE PERCENT OF THE COMPONENTS
12970            1')
12980    23      FORMAT (//////,15H SAMPLE NUMBER ,I3)
12990    24      FORMAT (' ATOMIC PERCENT OF THE ELEMENTS',/)
13000    25      FORMAT ('X',A2,3H = ,F8.4,/)
13010            END
13020            SUBROUTINE PPMAOX
13030    C
13040            COMMON /ONE/ TITLE(18),VALUE(20,20),ANAME(20),NUMBER(20),WTFRC(20)
13050            1,EXRINT(20),WTFRCN(20)
13060            COMMON /TWO/ WGHT(100),ALIST(100),LIST(100),ISAMP,ICOMP
13070            COMMON /FOUR/ CATION(20),ANION(20),AMOWT(20),ATWTCA(20),ATWTAN(20)
13080            1,DIV(20),FNOCAT(20),FNOANI(20),BMAG(20),ATWTEL(25),ELEM(25),AA(20)
13090            2,BB(20),NOEL(25),ADIV(20),AMAG(30),QUANT,IOUT(10),NOCAT(20),NOANI(
13100            320),NOCOMP,NAN,NCAT,INCODE,IO,KSQ,ISAVE(10)
13110            IF (ISAMP.NE.1) GO TO 1
13120            WRITE (IO,3)
13130    1       DO 2 I=1,NOCOMP
13140            BMAG(I)=BMAG(I)/(10.)**4
13150    2       CONTINUE
13160            RETURN
13170    C
13180    C
13190    3       FORMAT (' DATA ENTERED ARE GIVEN IN PARTS PER MILLION ( BY MOLE )
13200            1OF THE OXIDES')
```

```
13210           END
13220           SUBROUTINE PPMWOX
13230     C
13240           COMMON /ONE/ TITLE(18),VALUE(20,20),ANAME(20),NUMBER(20),WTFRC(20)
13250          1,EXRINT(20),WTFRCN(20)
13260           COMMON /TWO/ WGHT(100),ALIST(100),LIST(100),ISAMP,ICOMP
13270           COMMON /FOUR/ CATION(20),ANION(20),AMOWT(20),ATWTCA(20),ATWTAN(20)
13280          1,DIV(20),FNOCAT(20),FNOANI(20),BMAG(20),ATWTEL(25),ELEM(25),AA(20)
13290          2,BB(20),NOEL(25),ADIV(20),AMAG(30),QUANT,IOUT(10),NOCAT(20),NOANI(
13300          320),NOCOMP,NAN,NCAT,INCODE,IO,KSQ,ISAVE(10)
13310           IF (ISAMP.NE.1) GO TO 1
13320           WRITE (IO,3)
13330     1     DO 2 I=1,NOCOMP
13340           BMAG(I)=(BMAG(I)/(10.)**4)
13350     2     CONTINUE
13360           RETURN
13370     C
13380     C
13390     3     FORMAT (' DATA ENTERED ARE GIVEN IN PARTS PER MILLION ( BY WEIGHT
13400          1) OF THE OXIDES')
13410           END
13420           SUBROUTINE WTELE
13430     C
13440           COMMON /ONE/ TITLE(18),VALUE(20,20),ANAME(20),NUMBER(20),WTFRC(20)
13450          1,EXRINT(20),WTFRCN(20)
13460           COMMON /TWO/ WGHT(100),ALIST(100),LIST(100),ISAMP,ICOMP
13470           COMMON /FOUR/ CATION(20),ANION(20),AMOWT(20),ATWTCA(20),ATWTAN(20)
13480          1,DIV(20),FNOCAT(20),FNOANI(20),BMAG(20),ATWTEL(25),ELEM(25),AA(20)
13490          2,BB(20),NOEL(25),ADIV(20),AMAG(30),QUANT,IOUT(10),NOCAT(20),NOANI(
13500          320),NOCOMP,NAN,NCAT,INCODE,IO,KSQ,ISAVE(10)
13510           IF (INCODE.EQ.10) GO TO 1
13520           IF (ISAMP.NE.1) GO TO 1
13530           WRITE (IO,4)
13540     1     SUM=0.0
13550           DO 2 I=1,ICOMP
13560           BMAG(I)=BMAG(I)/ATWTEL(I)
13570           SUM=SUM+BMAG(I)
13580     2     CONTINUE
13590           DO 3 I=1,ICOMP
13600           BMAG(I)=(BMAG(I)/SUM)*100.
13610     3     CONTINUE
13620           RETURN
13630     C
13640     C
13650     4     FORMAT (' DATA ENTERED ARE GIVEN IN WEIGHT PERCENT OF THE ELEMENTS
13660          1')
13670           END
13680           SUBROUTINE PPMAEL
13690     C
13700           COMMON /ONE/ TITLE(18),VALUE(20,20),ANAME(20),NUMBER(20),WTFRC(20)
13710          1,EXRINT(20),WTFRCN(20)
13720           COMMON /TWO/ WGHT(100),ALIST(100),LIST(100),ISAMP,ICOMP
13730           COMMON /FOUR/ CATION(20),ANION(20),AMOWT(20),ATWTCA(20),ATWTAN(20)
13740          1,DIV(20),FNOCAT(20),FNOANI(20),BMAG(20),ATWTEL(25),ELEM(25),AA(20)
13750          2,BB(20),NOEL(25),ADIV(20),AMAG(30),QUANT,IOUT(10),NOCAT(20),NOANI(
13760          320),NOCOMP,NAN,NCAT,INCODE,IO,KSQ,ISAVE(10)
13770           IF (ISAMP.NE.1) GO TO 1
13780           WRITE (IO,3)
13790     1     DO 2 I=1,ICOMP
13800           BMAG(I)=BMAG(I)/(10.)**4
```

```
13810   2       CONTINUE
13820           RETURN
13830   C
13840   C
13850   3       FORMAT (' DATA ENTERED ARE GIVEN IN PARTS PER MILLION ( ATOMIC ) O
13860          1F THE ELEMENTS')
13870           END
13880           SUBROUTINE PPMWEL
13890   C
13900           COMMON /ONE/ TITLE(18),VALUE(20,20),ANAME(20),NUMBER(20),WTFRC(20)
13910          1,EXRINT(20),WTFRCN(20)
13920           COMMON /TWO/ WGHT(100),ALIST(100),LIST(100),ISAMP,ICOMP
13930           COMMON /FOUR/ CATION(20),ANION(20),AMOWT(20),ATWTCA(20),ATWTAN(20)
13940          1,DIV(20),FNOCAT(20),FNOANI(20),BMAG(20),ATWTEL(25),ELEM(25),AA(20)
13950          2,BB(20),NOEL(25),ADIV(20),AMAG(30),QUANT,IOUT(10),NOCAT(20),NOANI(
13960          320),NOCOMP,NAN,NCAT,INCODE,IO,KSQ,ISAVE(10)
13970           IF (ISAMP.NE.1) GO TO 1
13980           WRITE (IO,4)
13990   1       SUM=0.0
14000           DO 2 I=1,ICOMP
14010           BMAG(I)=(BMAG(I)/(10.)**4)/ATWTEL(I)
14020           SUM=SUM+BMAG(I)
14030   2       CONTINUE
14040           DO 3 I=1,ICOMP
14050           BMAG(I)=(BMAG(I)/SUM)*100.
14060   3       CONTINUE
14070           RETURN
14080   C
14090   C
14100   4       FORMAT (' DATA ENTERED ARE GIVEN IN PARTS PER MILLION ( BY WEIGHT
14110          1) OF THE ELEMENTS')
14120           END
14130           SUBROUTINE GRAMS
14140   C
14150           COMMON /ONE/ TITLE(18),VALUE(20,20),ANAME(20),NUMBER(20),WTFRC(20)
14160          1,EXRINT(20),WTFRCN(20)
14170           COMMON /TWO/ WGHT(100),ALIST(100),LIST(100),ISAMP,ICOMP
14180           COMMON /FOUR/ CATION(20),ANION(20),AMOWT(20),ATWTCA(20),ATWTAN(20)
14190          1,DIV(20),FNOCAT(20),FNOANI(20),BMAG(20),ATWTEL(25),ELEM(25),AA(20)
14200          2,BB(20),NOEL(25),ADIV(20),AMAG(30),QUANT,IOUT(10),NOCAT(20),NOANI(
14210          320),NOCOMP,NAN,NCAT,INCODE,IO,KSQ,ISAVE(10)
14220           IF (ISAMP.NE.1) GO TO 1
14230           WRITE (IO,7)
14240   1       WTSUM=0.0
14250           DO 2 I=1,NOCOMP
14260           WTSUM=WTSUM+BMAG(I)
14270   2       CONTINUE
14280           DO 3 I=1,NOCOMP
14290           BMAG(I)=(BMAG(I)/WTSUM)*100.
14300   3       CONTINUE
14310           IF (IOUT(1).NE.0) GO TO 4
14320           GO TO 6
14330   4       WRITE (IO,10) ISAMP
14340           WRITE (IO,9)
14350           DO 5 I=1,NOCOMP
14360           WRITE (IO,8) CATION(I),AA(I),ANION(I),BB(I),BMAG(I)
14370   5       CONTINUE
14380           IOUT(1)=0
14390   6       RETURN
14400   C
```

D-4996

```
14410   C
14420   7       FORMAT (' DATA ENTERED ARE GIVEN IN GRAMS OF THE COMPONENTS')
14430   8       FORMAT ('X',2(A2,A1),3H = ,F8.4,/)
14440   9       FORMAT (' WEIGHT PERCENT OF THE COMPONENTS'/)
14450   10      FORMAT (/////,15H SAMPLE NUMBER ,I3)
14460           END
14470           SUBROUTINE GRAMEL
14480   C
14490           COMMON /ONE/ TITLE(18),VALUE(20,20),ANAME(20),NUMBER(20),WTFRC(20)
14500          1,EXRINT(20),WTFRCN(20)
14510           COMMON /TWO/ WGHT(100),ALIST(100),LIST(100),ISAMP,ICOMP
14520           COMMON /FOUR/ CATION(20),ANION(20),AMOWT(20),ATWTCA(20),ATWTAN(20)
14530          1,DIV(20),FNOCAT(20),FNOANI(20),BMAG(20),ATWTEL(25),ELEM(25),AA(20)
14540          2,BB(20),NOEL(25),ADIV(20),AMAG(30),QUANT,IOUT(10),NOCAT(20),NOANI(
14550          320),NOCOMP,NAN,NCAT,INCODE,IO,KSQ,ISAVE(10)
14560           IF (ISAMP.NE.1) GO TO 1
14570           WRITE (IO,4)
14580   1       SUM=0.0
14590           DO 2 I=1,ICOMP
14600           SUM=SUM+BMAG(I)
14610   2       CONTINUE
14620           DO 3 I=1,ICOMP
14630           BMAG(I)=(BMAG(I)/SUM)*100.
14640   3       CONTINUE
14650           RETURN
14660   C
14670   C
14680   4       FORMAT (' DATA ENTERED ARE GIVEN IN GRAMS OF THE ELEMENTS')
14690           END
14700           SUBROUTINE CALC (KOUNT)
14710   C
14720           DIMENSION A(900), IMAG(25)
14730           COMMON /ONE/ TITLE(18),VALUE(20,20),ANAME(20),NUMBER(20),WTFRC(20)
14740          1,EXRINT(20),WTFRCN(20)
14750           COMMON /TWO/ WGHT(100),ALIST(100),LIST(100),ISAMP,ICOMP
14760           COMMON /FOUR/ CATION(20),ANION(20),AMOWT(20),ATWTCA(20),ATWTAN(20)
14770          1,DIV(20),FNOCAT(20),FNOANI(20),BMAG(20),ATWTEL(25),ELEM(25),AA(20)
14780          2,BB(20),NOEL(25),ADIV(20),AMAG(30),QUANT,IOUT(10),NOCAT(20),NOANI(
14790          320),NOCOMP,NAN,NCAT,INCODE,IO,KSQ,ISAVE(10)
14800           IQ=0
14810           K=0
14820           KK=1
14830           DO 53 M=1,10
14840           IF (IOUT(M).NE.0) GO TO 1
14850           IQ=IQ+1
14860           GO TO 53
14870   1       IQ=IQ+1
14880           WRITE (IO,56) ISAMP
14890           GO TO (10,15,30,33,36,40,42,44,47,50), IQ
14900   2       DO 3 I=1,ISUM
14910           WRITE (IO,57) CATION(I),AA(I),ANION(I),BB(I),AMAG(I)
14920   3       CONTINUE
14930           GO TO 53
14940   4       DO 5 I=1,ISUM
14950           IMAG(I)=AMAG(I)
14960           WRITE (IO,58) CATION(I),AA(I),ANION(I),BB(I),IMAG(I)
14970   5       CONTINUE
14980           GO TO 53
14990   6       DO 7 I=1,ISUM
15000           WRITE (IO,59) ELEM(I),AMAG(I)
```

D-4996

```
15010   7    CONTINUE
15020        GO TO 53
15030   8    DO 9 I=1,ISUM
15040        IMAG(I)=AMAG(I)
15050        WRITE (IO,60) ELEM(I),IMAG(I)
15060   9    CONTINUE
15070        GO TO 53
15080  10    GO TO (11,12,53,12), KK
15090  11    WRITE (IO,61)
15100        GO TO 15
15110  12    SUM=0.0
15120        DO 13 I=1,NOCOMP
15130        AMAG(I)=AMAG(I)*AMOWT(I)
15140        SUM=SUM+AMAG(I)
15150  13    CONTINUE
15160        DO 14 I=1,NOCOMP
15170        AMAG(I)=(AMAG(I)/SUM)*100.
15180  14    CONTINUE
15190        ISUM=NOCOMP
15200        GO TO (2,34,53,48), KK
15210  15    IF (NOCOMP.GT.ICOMP) GO TO 29
15220        JJ=1
15230        J=1
15240        I=1
15250        IF (IQ.NE.2) GO TO 16
15260        WRITE (IO,62)
15270  16    IF (I.EQ.NOCOMP+1) GO TO 22
15280        IF (ELEM(J).EQ.CATION(I)) GO TO 17
15290        IF (ELEM(J).EQ.ANION(I)) GO TO 18
15300        GO TO 19
15310  17    A(JJ)=FNOCAT(I)/ADIV(I)
15320        GO TO 20
15330  18    A(JJ)=FNOANI(I)/ADIV(I)
15340        GO TO 20
15350  19    A(JJ)=0.0
15360  20    JJ=JJ+1
15370        IF (J.EQ.NOCOMP) GO TO 21
15380        J=J+1
15390        GO TO 16
15400  21    J=1
15410        I=I+1
15420        GO TO 16
15430  22    DO 23 I=1,NOCOMP
15440        AMAG(I)=BMAG(I)
15450  23    CONTINUE
15460        CALL SIMQ(A,AMAG,NOCOMP,KS)
15470        IF (KS.EQ.1) GO TO 24
15480        GO TO 26
15490  24    KSQ=KSQ+1
15500        WRITE (IO,63)
15510        IF (KSQ.EQ.4) GO TO 25
15520        GO TO 53
15530  25    WRITE (IO,64)
15540        ISAVE(1)=0
15550        ISAVE(2)=0
15560        ISAVE(3)=0
15570        ISAVE(4)=0
15580        ISAVE(9)=0
15590        GO TO 53
15600  26    SUM=0.0
```

D-4996

```
15610        DO 27 I=1,NOCOMP
15620        SUM=SUM+AMAG(I)
15630   27   CONTINUE
15640        DO 28 I=1,NOCOMP
15650        AMAG(I)=(AMAG(I)/SUM)*100.
15660   28   CONTINUE
15670        ISUM=NOCOMP
15680        IF (IQ.EQ.2) GO TO 2
15690        GO TO (12,12,31,12), KK
15700   29   WRITE (IO,65)
15710        GO TO 54
15720   30   KK=3
15730        WRITE (IO,66)
15740        GO TO 15
15750   31   DO 32 I=1,NOCOMP
15760        AMAG(I)=AMAG(I)*(10.)**4
15770   32   CONTINUE
15780        ISUM=NOCOMP
15790        GO TO 4
15800   33   KK=2
15810        WRITE (IO,67)
15820        GO TO 15
15830   34   DO 35 I=1,NOCOMP
15840        AMAG(I)=AMAG(I)*(10.)**4
15850   35   CONTINUE
15860        ISUM=NOCOMP
15870        GO TO 4
15880   36   IF (K.NE.0) GO TO 37
15890        WRITE (IO,68)
15900   37   SUM=0.0
15910        DO 38 I=1,ICOMP
15920        AMAG(I)=BMAG(I)*ATWTEL(I)
15930        SUM=SUM+AMAG(I)
15940   38   CONTINUE
15950        DO 39 I=1,ICOMP
15960        AMAG(I)=(AMAG(I)/SUM)*100.
15970        IF (KOUNT.NE.0) GO TO 39
15980        VALUE(I,ISAMP)=AMAG(I)/100.
15990        ANAME(I)=ELEM(I)
16000   39   CONTINUE
16010        ISUM=ICOMP
16020        IF (K.EQ.0) GO TO 6
16030        GO TO (45,51), K
16040   40   WRITE (IO,69)
16050        DO 41 I=1,ICOMP
16060        AMAG(I)=BMAG(I)
16070        AMAG(I)=BMAG(I)
16080   41   CONTINUE
16090        ISUM=ICOMP
16100        GO TO 6
16110   42   WRITE (IO,70)
16120        DO 43 I=1,ICOMP
16130        AMAG(I)=BMAG(I)*(10.)**4
16140   43   CONTINUE
16150        ISUM=ICOMP
16160        GO TO 8
16170   44   WRITE (IO,71)
16180        K=1
16190        GO TO 36
16200   45   DO 46 I=1,ICOMP
```

```
D-4996

16210           AMAG(I)=AMAG(I)*(10.)**4
16220    46     CONTINUE
16230           ISUM=ICOMP
16240           GO TO 8
16250    47     WRITE (IO,72) QUANT
16260           KK=4
16270           GO TO 15
16280    48     DO 49 I=1,ICOMP
16290           AMAG(I)=(AMAG(I)/100.)*QUANT
16300    49     CONTINUE
16310           ISUM=NOCOMP
16320           GO TO 2
16330    50     WRITE (IO,73) QUANT
16340           K=2
16350           GO TO 36
16360    51     DO 52 I=1,ICOMP
16370           AMAG(I)=(AMAG(I)/100.)*QUANT
16380    52     CONTINUE
16390           ISUM=ICOMP
16400           GO TO 6
16410    53     CONTINUE
16420           GO TO 55
16430    54     ISAVE(1)=0
16440           ISAVE(2)=0
16450           ISAVE(3)=0
16460           ISAVE(4)=0
16470           ISAVE(9)=0
16480    55     RETURN
16490    C
16500    C
16510    56     FORMAT (//////,15H SAMPLE NUMBER ,I3)
16520    57     FORMAT ('X',2(A2,A1),3H = ,F8.4,/)
16530    58     FORMAT ('X',2(A2,A1),3H = ,I7,/)
16540    59     FORMAT ('X',A2,3H = ,F8.4,/)
16550    60     FORMAT ('X',A2,3H = ,I7,/)
16560    61     FORMAT (' WEIGHT PERCENT OF THE COMPONENTS',/)
16570    62     FORMAT (' MOLE PERCENT OF THE COMPONENTS',/)
16580    63     FORMAT (' THE DETERMINANT OF SIMULTANEOUS EQUATIONS IS ZERO',/,' T
16590           1HIS SAMPLE IS SKIPPED')
16600    64     FORMAT (' THE DETERMINANT OF SIMULTANEOUS EQUATIONS OF FOUR CONSEC
16610           1UTIVE SAMPLES HAS BEEN ZERO',/,' THIS SELECTION AND SELECTIONS 1 T
16620           20 4 AND 9 IF REQUESTED ARE SKIPPED')
16630    65     FORMAT (' THE NUMBER OF COMPONENTS IS GREATER THAN THE NUMBER OF E
16640           1LEMENTS',/,' NO SOLUTION OF SIMULTANEOUS EQUATIONS IS POSSIBLE. TH
16650           2IS SELECTION AND SELECTIONS 1 TO 4 AND 9 IF REQUESTED ARE SKIPPED'
16660           3)
16670    66     FORMAT (' PARTS PER MILLION ( BY MOLE ) OF THE COMPOUNDS',/)
16680    67     FORMAT (' PARTS PER MILLION ( BY WEIGHT ) OF THE COMPOUNDS',/)
16690    68     FORMAT (' WEIGHT PERCENT OF THE ELEMENTS',/)
16700    69     FORMAT (' ATOMIC PERCENT OF THE ELEMENTS',/)
16710    70     FORMAT (' PARTS PER MILLION ( ATOMIC ) OF THE ELEMENTS',/)
16720    71     FORMAT (' PARTS PER MILLION ( BY WEIGHT ) OF THE ELEMENTS',/)
16730    72     FORMAT (51H GRAMS OF THE COMPONENTS TO MAKE A TOTAL WEIGHT OF ,F7.
16740           14,7H GRAMS ,/)
16750    73     FORMAT (49H GRAMS OF THE ELEMENTS TO MAKE A TOTAL WEIGHT OF ,F7.4,
16760           17H GRAMS ,/)
16770           END
16780           SUBROUTINE SIMQ (A,B,N,KS)
16790    C
16800           DIMENSION A(900), B(30)
```

```
16810           COMMON /ONE/ TITLE(18),VALUE(20,20),ANAME(20),NUMBER(20),WTFRC(20)
16820          1,EXRINT(20),WTFRCN(20)
16830           COMMON /TWO/ WGHT(100),ALIST(100),LIST(100),ISAMP,ICOMP
16840           COMMON /FOUR/ CATION(20),ANION(20),AMOWT(20),ATWTCA(20),ATWTAN(20)
16850          1,DIV(20),FNOCAT(20),FNOANI(20),BMAG(20),ATWTEL(25),ELEM(25),AA(20)
16860          2,BB(20),NOEL(25),ADIV(20),AMAG(30),QUANT,IOUT(10),NOCAT(20),NOANI(
16870          320),NOCOMP,NAN,NCAT,INCODE,IO,KSQ,ISAVE(10)
16880           TOL=0.0
16890           KS=0
16900           JJ=-N
16910           DO 8 J=1,N
16920           JY=J+1
16930           JJ=JJ+N+1
16940           BIGA=0
16950           IT=JJ-J
16960           DO 2 I=J,N
16970           IJ=IT+I
16980           IF (ABS(BIGA)-ABS(A(IJ))) 1,2,2
16990     1     BIGA=A(IJ)
17000           IMAX=I
17010     2     CONTINUE
17020           IF (ABS(BIGA)-TOL) 3,3,4
17030     3     KS=1
17040           RETURN
17050     4     I1=J+N*(J-2)
17060           IT=IMAX-J
17070           DO 5 K=J,N
17080           I1=I1+N
17090           I2=I1+IT
17100           SAVE=A(I1)
17110           A(I1)=A(I2)
17120           A(I2)=SAVE
17130     5     A(I1)=A(I1)/BIGA
17140           SAVE=B(IMAX)
17150           B(IMAX)=B(J)
17160           B(J)=SAVE/BIGA
17170           IF (J-N) 6,9,6
17180     6     IQS=N*(J-1)
17190           DO 8 IX=JY,N
17200           IXJ=IQS+IX
17210           IT=J-IX
17220           DO 7 JX=JY,N
17230           IXJX=N*(JX-1)+IX
17240           JJX=IXJX+IT
17250     7     A(IXJX)=A(IXJX)-(A(IXJ)*A(JJX))
17260     8     B(IX)=B(IX)-(B(J)*A(IXJ))
17270     9     NY=N-1
17280           IT=N*N
17290           DO 10 J=1,NY
17300           IA=IT-J
17310           IB=N-J
17320           IC=N
17330           DO 10 K=1,J
17340           B(IB)=B(IB)-A(IA)*B(IC)
17350           IA=IA-N
17360    10     IC=IC-1
17370           RETURN
17380           END
```

While a particular embodiment of the invention and certain modifications have been described, other modifications may be made. The following claims are, therefore, intended to cover any such modifications within the true spirit and scope of the invention.

What is claimed is:

1. In X-ray emission spectroscopy a method of quantitative chemical analysis of an unknown sample, wherein each of the following computing steps is performed on automatic computing apparatus, said method comprising:
  a. irradiating a known standard with X-rays to produce an observed characteristic X-ray intensity from the elements in the standard,
  b. computing from the observed X-ray intensity of the elements in the standard the first order approximation of the intensity of the most efficient excitation energy for each element,
  c. computing from said approximations of the intensity of the most efficient excitation energy and an assumed chemical composition of said unknown sample, the expected characteristic X-ray intensity of elements in said sample, and
  d. adjusting the assumed chemical composition of the unknown sample used in step (c) until said expected X-ray intensities match the observed X-ray intensities of each element in said unknown sample.

2. The method recited in claim 1 wherein the step of computing the first order approximation of the original intensity of the most efficient excitation energy of each element is performed in accordance with:

$$I_i^\circ = \frac{I_i (\sec\theta_1 \mu_a^p + \sec\theta_2 \mu_a^i)}{\sec\theta_2 \mu_i^p W_i \frac{K_i-1}{K_i} \Omega_i R_i}$$

where $I_i^\circ$ is the first order approximation of the intensity of the most efficient excitation energy of the ith element, $I_i$ is the observed X-ray intensity for the ith element, $\theta_1$ is the angle of incidence of the irradiating energy, $\theta_2$ is the angle at which characteristic X-rays are observed, $\mu_a^p$ is the mass absorption coefficient of the sample for the most efficient X-rays, $\mu_a^i$ is the mass absorption coefficient of the sample for the ith radiation, $\mu_i^p$ is the mass absorption coefficient of the ith element for the most efficient X-rays, $W_i$ is the weight fraction of element $i$, $K_i$ is the absorption edge jump ratio for the ith element, $\Omega_i$ is the fluorescent yield of the ith element, and $R_i$ is the fraction of the characteristic X-rays in the analyzed line's series.

3. The method recited in claim 1 wherein the step of computing the expected X-ray intensity for each element in the unknown is performed in accordance with:

$$I_i^{calc} = \frac{\sec\theta_2 I_i^\circ \mu_i^p W_i \frac{K_i-1}{K_i} \Omega_i R_i}{\sec\theta_1 \mu_a^p + \sec\theta_2 \mu_a^i}$$
$$+ \frac{1}{2\cos\theta_2} \sum_{j=1}^{n} \frac{Q_j^p Q_i^j I_j^\circ}{\mu_a^p \sec\theta_1 + \mu_a^i \sec\theta_2} \left\{ \frac{\cos\theta_2}{\mu_a^i} 1N\left[1 + \frac{\mu_a^i \sec\theta_2}{\mu_a^j}\right] \right.$$
$$\left. + \frac{\cos\theta_1}{\mu_a^p} 1N\left[1 + \frac{\mu_a^p \sec\theta_1}{\mu_a^j}\right] \right\}$$

where $$Q_k^1 = \mu_k^1 W_k \frac{K_i-1}{K_k} \Omega_k R_k$$

$I_i^\circ$ is the first order approximation of the intensity of the most efficient excitation energy of the ith element, $I_i$ is the observed X-ray intensity for the ith element, $\theta_1$ is the angle of incidence of the irradiating energy, $\theta_2$ is the angle at which characteristic X-rays are observed, $\mu_a^p$ is the mass absorption coefficient of the sample for the most efficient X-rays, $\mu_a^i$ is the mass absorption coefficient of the sample for the ith radiation, $\mu_i^p$ is the mass absorption coefficient of the ith element for the most efficient X-rays, $W_i$ is the weight fraction of element $i$, $K_i$ is the absorption edge jump ratio for the ith element, $\Omega_i$ is the fluorescent yield of the ith element, and $R_i$ is the fraction of the characteristic X-rays in the analyzed line's series.

* * * * *